United States Patent [19]

Garcia

[11] Patent Number: 5,611,570
[45] Date of Patent: Mar. 18, 1997

[54] UNIBEAM TRAILER CHASSIS

[75] Inventor: Roberto R. Garcia, Kent, Wash.

[73] Assignee: Panderra Enterprises Inc., Tacoma, Wash.

[21] Appl. No.: 423,744

[22] Filed: Apr. 17, 1995

[51] Int. Cl.[6] ............................................. B62D 63/06
[52] U.S. Cl. ........................... 280/789; 280/799; 296/182
[58] Field of Search ............................. 296/182, 204; 280/781, 785, 786, 789, 796, 797, 798, 799

[56] References Cited

U.S. PATENT DOCUMENTS

| | | | |
|---|---|---|---|
| 1,723,518 | 8/1929 | Murray | 280/796 |
| 2,846,263 | 8/1958 | La Rue | 296/182 |
| 3,096,996 | 7/1963 | Cole | 280/789 |
| 3,856,344 | 12/1974 | Loeber | 280/789 |
| 3,939,553 | 2/1976 | Feterl | 29/469 |
| 4,396,208 | 8/1983 | Koch | 280/789 |
| 4,400,004 | 8/1983 | Arguin | 280/408 |
| 4,526,395 | 7/1985 | Arguin | 280/408 |
| 4,534,589 | 8/1985 | Booher | 296/182 |
| 4,580,805 | 4/1986 | Bertolini | 280/405 A |
| 4,728,144 | 3/1988 | Crean | 296/168 |
| 4,761,031 | 8/1988 | Rowe et al. | 296/182 |
| 4,969,659 | 11/1990 | Ehrlich | 280/407.1 |
| 5,071,164 | 12/1991 | Gregg | 280/786 |
| 5,154,480 | 10/1992 | Jones | 296/181 |
| 5,215,331 | 6/1993 | Pittman | 280/788 |

FOREIGN PATENT DOCUMENTS 248127  12/1987  European Pat. Off. ............... 296/182

*Primary Examiner*—Paul N. Dickson
*Attorney, Agent, or Firm*—John S. Sundsmo; Weiss, Jensen, Ellis and Howard

[57] ABSTRACT

A unibeam chassis with at least two longitudinal unibeam members and two lateral unibeam members each of which members being joined the one to the other by a single contiguous uniflange, wherein each of the two longitudinal unibeams comprises a longitudinal web, a longitudinal flange, and the uniflange, each of the two lateral unibeams comprises a lateral web, a lateral flange, and the uniflange, and the single contiguous uniflange is fastened in a perpendicular orientation to each of the longitudinal and lateral webs, and the longitudinal and lateral flanges are fastened in a perpendicular orientation to each of the longitudinal and lateral webs.

8 Claims, 14 Drawing Sheets

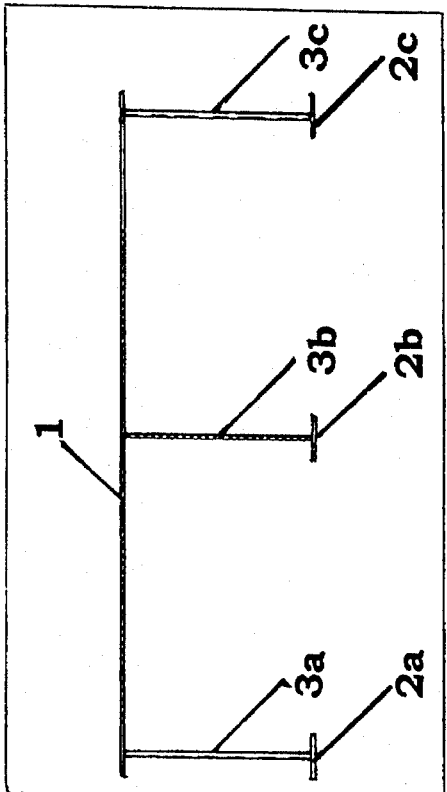
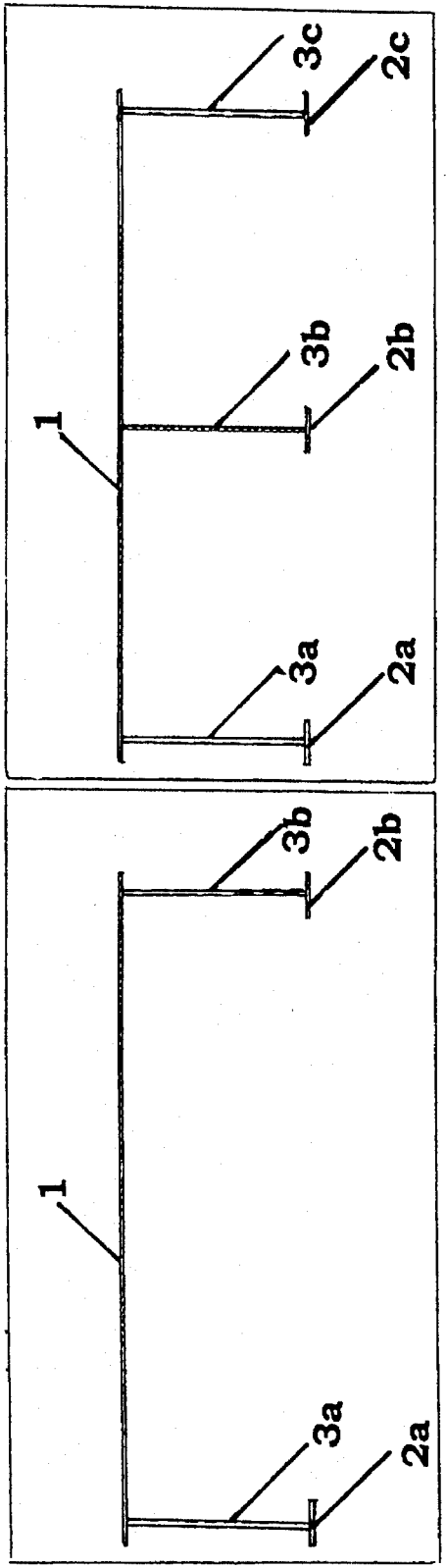
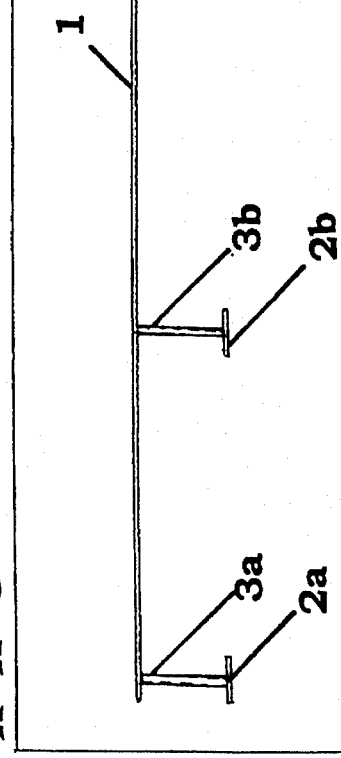
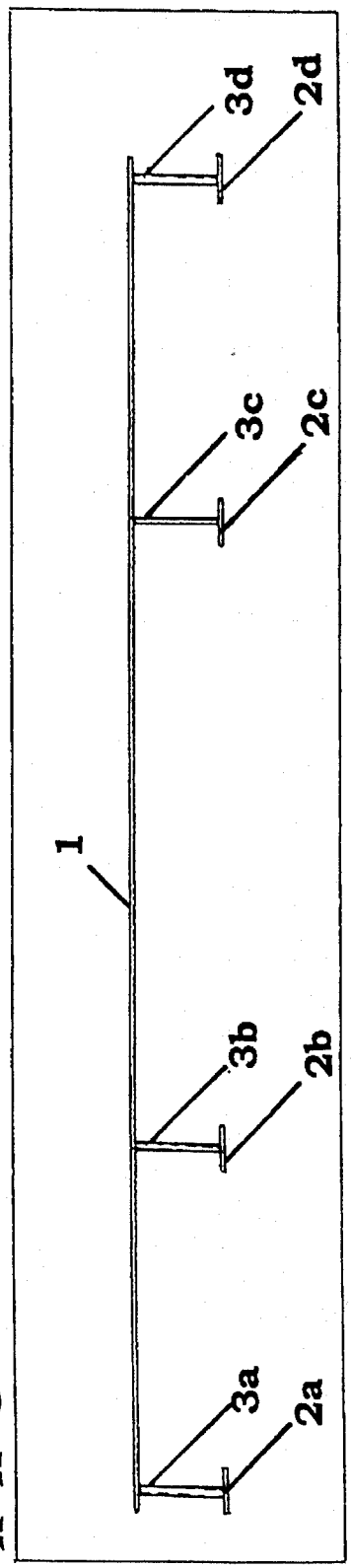

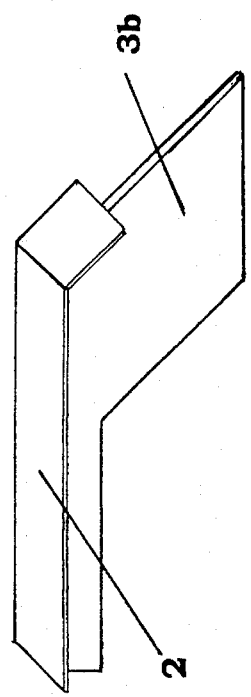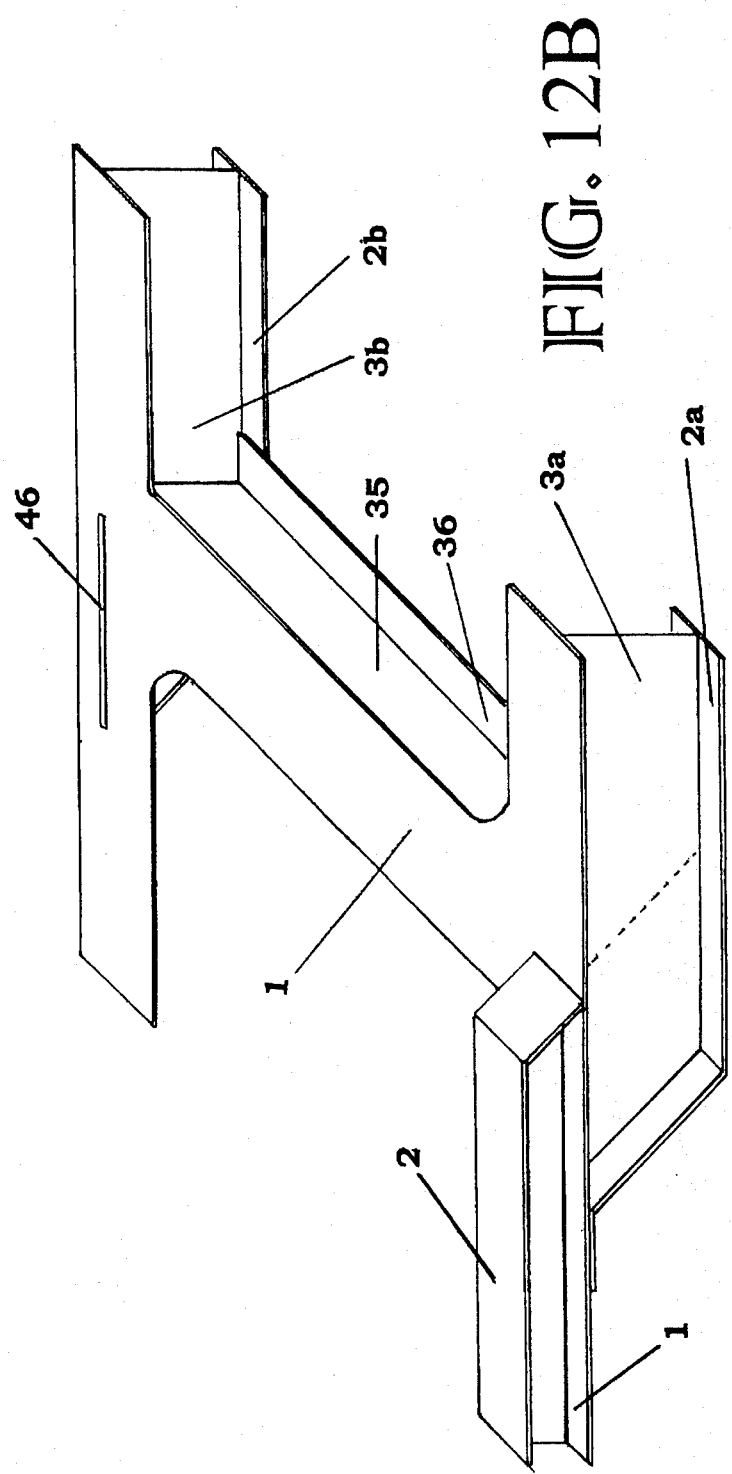

UNIBEAM TRAILER CHASSIS

FIELD OF THE INVENTION

The field of the invention relates generally to chassis useful in trailers, and particularly to 2–9 axle truck trailer chassis used for hauling maximum loads.

BACKGROUND OF THE INVENTION

The growth in container shipping over the past decade has created some special problems and opportunities for the commercial trucking industry. In particular, shipping containers are remarkably strong and even a twenty-foot container is capable of carrying a concentrated load that is in excess of that normally carried in a 40 foot van. As distribution centers for import and export of bulk and consumer goods have become less centralized in recent years, the challenge has been to find ways of transporting heavy containers on state and federal highways. Standards established by Federal and state departments of transportation have established standard for roadways and bridges designed to spread the load.

The Federal Interstates Bridge Laws (FBL) sets forth a formula (W=500[LN/(N−1)+12N+36]) for calculating the maximum allowable weight carded by any group of 2 or more axles, wherein W is the maximum weight carded by any group of 2 or more axles, L is the distance in feet between the extremes of any group of 2 or more consecutive axles, and N is the number of axles. According to the formula a 20 foot trailer with 2 axles can have a maximum allowable weight of only 50,000 (including the weight of the trailer chassis). In the 1970–80's the only West Coast ports capable of off-loading containers onto the public roads were in the states of Oregon and Washington and in Vancouver, British Columbia. As an example of load limits, the Department of Transportation (DOT) for the State of Washington administers state law 46.44.041; (amended by Chapter 102, Laws of 1993) as follows: "No vehicle or combination of vehicles shall operate upon the public highways of this state with a gross load on any single axle in excess of twenty thousand pounds, or upon any group of axles in excess of that set forth in the following table, except that two consecutive sets of tandem axles may carry a gross load of thirty-four thousand pounds each, if the overall distance between the first and the last axles of such consecutive sets of tandem axles is thirty-six feet, or more." The data in the accompanying DOT table shows a maximum weight of 40,000 pounds for twin axle trailer and 60,000 for a trailer with three axles at a distance between the consecutive sets of axles of 32 feet. Shipping containers are commonly about twenty or forty feet in length and a 20 foot container may be capable of carrying 50,000 pounds. The rising popularity in use of maximum-weight containers (also abbreviated herein MWC), particularly for hauling bulk cargoes such as hay, apples, and mineral ores have created special challenges for truck trailer chassis designers. Trailers slidably extending in length are one solution that has been disclosed in the art (e.g., see U.S. Pat. Nos. 4,400,004; 4,580,805; and 4,969,659).

Use of trailers for hauling MWC has revealed limitations in the art. When a chassis is extended to allow a 20-foot MWC to be carried, the distance between the axles increases and the container load is centrally loaded on the chassis, i.e., a "bridging" load. The central loading puts heavy "flex stresses" on the trailer and it is not uncommon for weld fractures and stress cracks to develop in heavy steel I-beams. The art has attempted to solve this problem by using deeper I-beam construction with thicker ½–5/8 inch top and bottom flanges. However, this adds significantly to the total weight of the trailer which in turn adds to fuel consumption and operating cost while at the same time reducing the maximum allowable FBL load. The use of triple axle has revealed still other limitations in the art. When turning or maneuvering long triple axle trailers loaded with MWC the chassis are exposed to tremendous "side load stresses", and weld cracks and longitudinal I-beam stress fractures may occur, sometimes within even a few weeks of use. An example of a cross-section of such a conventional I-beam trailer is shown in FIG. 1, where arrows point to where weld and frame failures may take place.

Traditional welded I-beam truck trailer chassis construction strengthened by gusset plates and angle irons, suffers from a number of disadvantages: namely, First, the I-beam structure is uniform in strength and weight, even at stations where less structure (and weight) are needed;

Second, to prevent fracturing in the middle of the bridging I-beams are commonly of a greater depth (and weight) in the entire beam than might be necessary. Greater beam depth, however, means added weight and decreased flexibility;

Third, trailers chassis having three or more axles, frequently exhibit weld fractures at the junction of the lateral and longitudinal I-beams, arrows FIG. 1. Longitudinal I-beam failures are also not uncommon. Adding extra bracing at the junction between the lateral and longitudinal I-beams, e.g., with angle irons, adds manufacturing cost and weight; and, Fourth, the strategy of adding a third axle and lengthening the trailer creates problems for the operator because it is difficult to load and unload trailers if the container is centrally located on a long span.

Since hauling MWC is a relatively new commercial enterprise the lifespan of most trailers is not clear, but recent experience suggest that it may be as short as 1–3 years. The replacement cost of a container trailer chassis is currently in the range of $18,000 to $50,000, making longevity a very desirable attribute.

It is thus a particular object of the present invention to solve the problems in the art by providing a strong chassis capable of hauling heavy loads, withstanding heaving bridging loads without fracturing and while minimizing weight, and operating and manufacturing costs.

SUMMARY OF THE INVENTION

A relatively stiff but flexible unibeam trailer chassis is disclosed that minimizes chassis weight while maximizing strength and distributing side-loading forces and beam flexing and torsional forces throughout the component elements of the unibeam. In its tri-flange configuration the unibeam consists of a single continuous top uni-flange, two longitudinal webs each fastened at their bottom edge to a longitudinal flange and at their top edge to the top uni-flange, and at least two lateral webs each fastened at their bottom edge to a lateral flange and their top to the uniflange. In alternative configurations quad-flange unibeams (i.e., having three longitudinal web members) and quint-flange unibeams (i.e., having four longitudinal web members) are disclosed. In other aspects, an improved chassis neck and rear axle support section are also provided using unibeam components.

BRIEF DESCRIPTION OF THE DRAWINGS

FIG. 4A is a schematic representation of a cross-section of a tri-flange-unibeam chassis taken at a station that lacks a lateral web (5). The representation depicts the following components of the tri-flange unibeam: namely, the single continuous uni-flange (1), the two longitudinal Flanges (2a, 2b), and the two longitudinal webs (3a, 3b).

FIG. 4B is a schematic representation of a cross-section of a quad-flange-unibeam chassis taken at a station that lacks a lateral web (5). The representation depicts the following components of the quad-flange unibeam: namely, the single continuous uni-flange (1), the three longitudinal flanges (2a, 2b, 2c), and the three longitudinal webs (3a, 3b, 3c).

FIG. 4C is a schematic representation of a cross-section of a quint-flange-unibeam chassis taken at a station that lacks a lateral web (5). The representation depicts the following components of the quint-flange unibeam: namely, the single continuous uni-flange (1), the four longitudinal flanges (2a, 2b, 2c, 2d), and the four longitudinal webs (3a, 3b, 3c, 3d).

FIG. 5A schematically depicts the lateral axle web (6) member fastened to uniflange (1) and overlapping the two longitudinal flanges (2). Also depicted in this perspective view is a lateral web (5), its associated lateral flange (4), and their orientation in respect to the longitudinal webs (3), longitudinal flanges (2) and uniflange (1).

FIG. 5B schematically depicts the same continuous lateral axle web (6) as depicted in FIG. 5A, but after two supporting lateral axle flanges (7) have been fastened to the longitudinal flange (2), i.e., one on each side of lateral axle web (6).

FIG. 10A depicts the relative positions of the king pin (41), front bolster (20), container fastener (22), landing gear mounting tube (34) and lateral landing gear web (35). FIG. 10B depicts the relative positions of the DOT bumper (43), rear bolster (23), container fastener (25), and twist lock/pin (24).

FIG. 9) of a flat neck bridging uniband trailer chassis for hauling maximum weight loads as disclosed in EXAMPLE 2, below. In this depiction the chassis is viewed from above and to the fight, prior to fastening the neck member (31; FIG. 9) to a mid-section (32; FIG. 9). Features depicted in FIG. 11 include the following: namely, the nose-section (47) and mid-section (48) of neck member (31); the landing gear mounting tubes (34); the lateral landing gear web (35); a lateral web (5); the continuous top uniflange (1); three longitudinal web members (3a, 3b, 3c); and the horizontal front bolster (20) that is of a fabricated "box-beam" unibeam construction (9; brackets). Also, for purposes of description only the landing gear mounting station (49) of neck member (31) is identified.

FIG. 12A, depicts an exploded view (top, FIG. 12A) and compressed view (bottom, FIG. 12B) of the landing gear mounting station (49) of the neck member (31) of FIG. 11, at the landing gear mounting station (49), i.e., to the fight in FIG. 12A, 12B is the nose-section (47) of FIG. 11 and to the left the mid-section (48) of FIG. 11. The figure depicts how the transition in elevation of the neck is achieved at station (49; FIG. 11 ). Central features include the following: namely, (i) The continuous uniflange (1) as it transitions (right-to-left) from the top surface of the nose-section (47) to the bottom surface of the mid-section (48);

Figure 3:
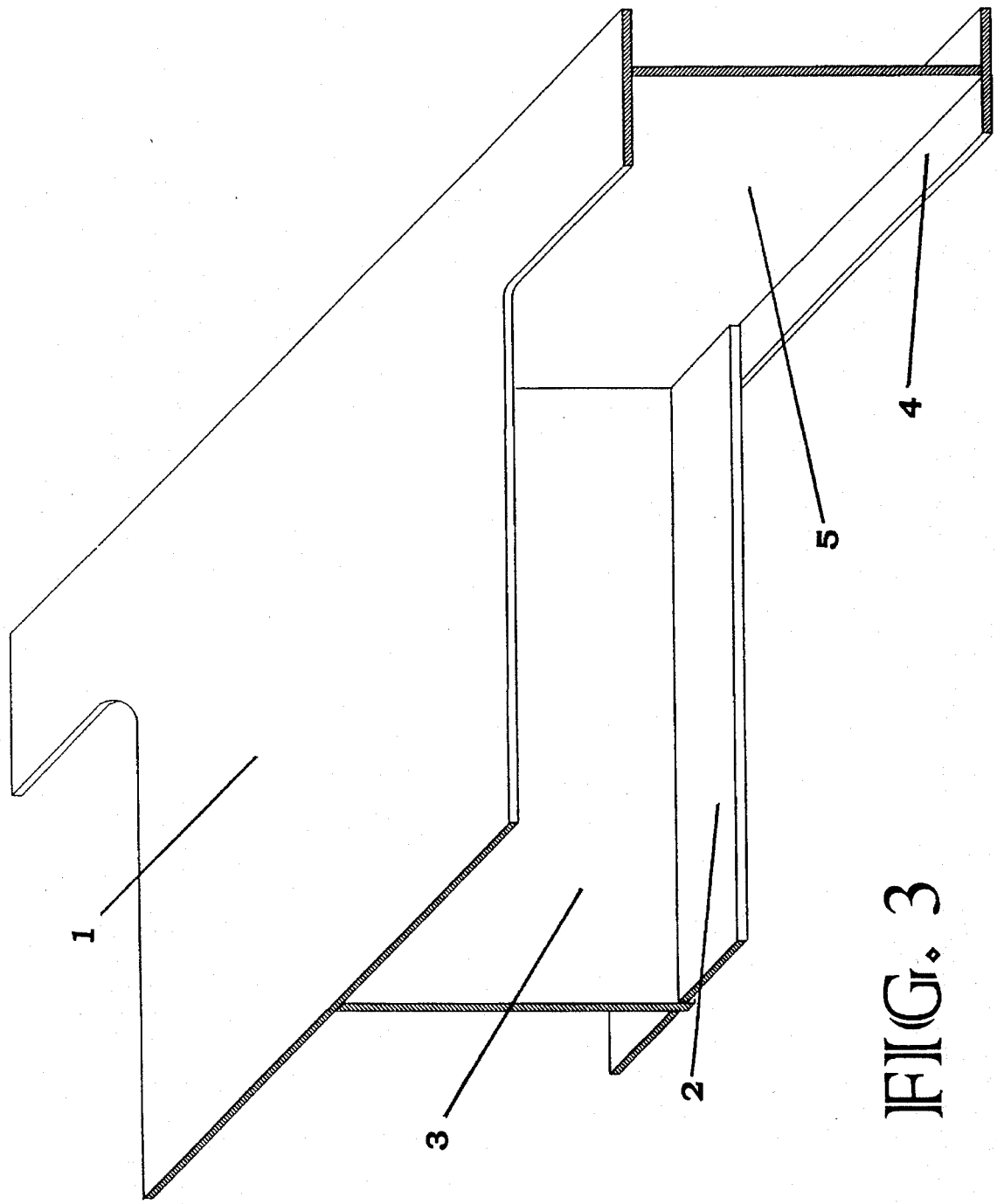
FIG. 3 depicts a perspective fragmented view of a portion of the tri-flange-unibeam chassis represented in FIG. 5 showing a portion of: the continuous uni-flange (1), the longitudinal flange (2), the longitudinal web (3), the lateral flange (4), and the lateral web(5).

(ii) Longitudinal webs (3a,3b) that are cut into a dog-leg shape that is 45-degrees to the horizontal axis at both the top and bottom;

(iii) Longitudinal webs (3a, 3b) extending through slots (46) cut in uniflange (1);

(iv) Longitudinal flanges (2a, 2b) of the nose-section (47) that are cut to a shape that is 45-degrees to the horizontal axis and terminate at the uniflange (1) of the mid-section (48); and, (v) the longitudinal flange (2) of mid-section (48) is in an inverted orientation relative to depiction in FIG. 3 or FIG. 4A. Other features depicted include lateral landing gear web (35) and lateral landing gear flange (36).

Figure 13A:
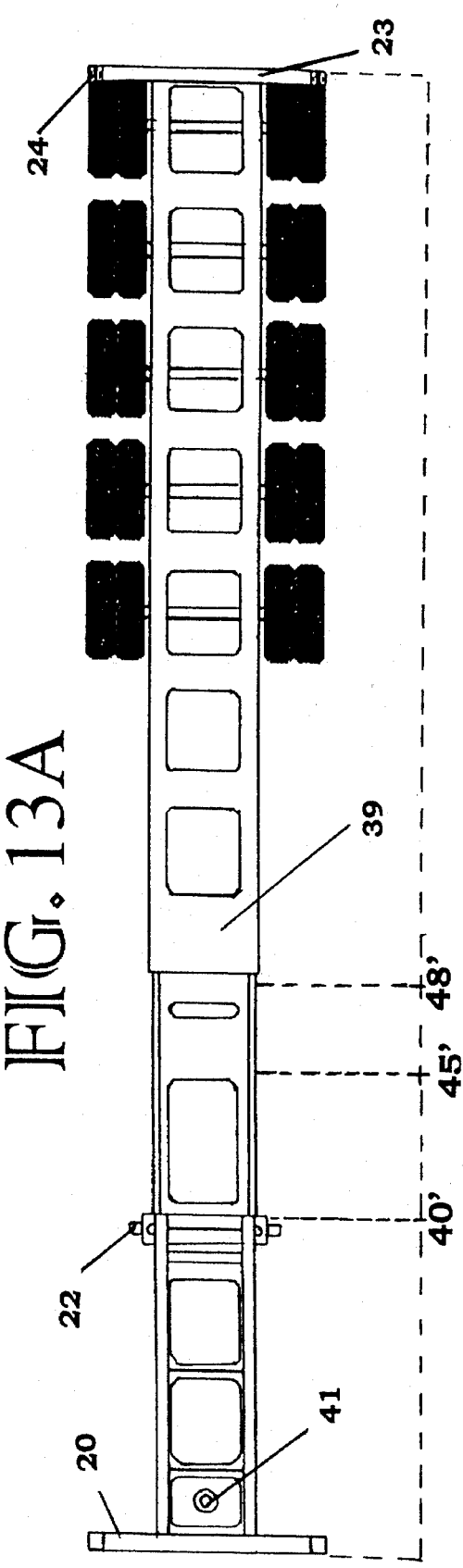
Figure 13B:
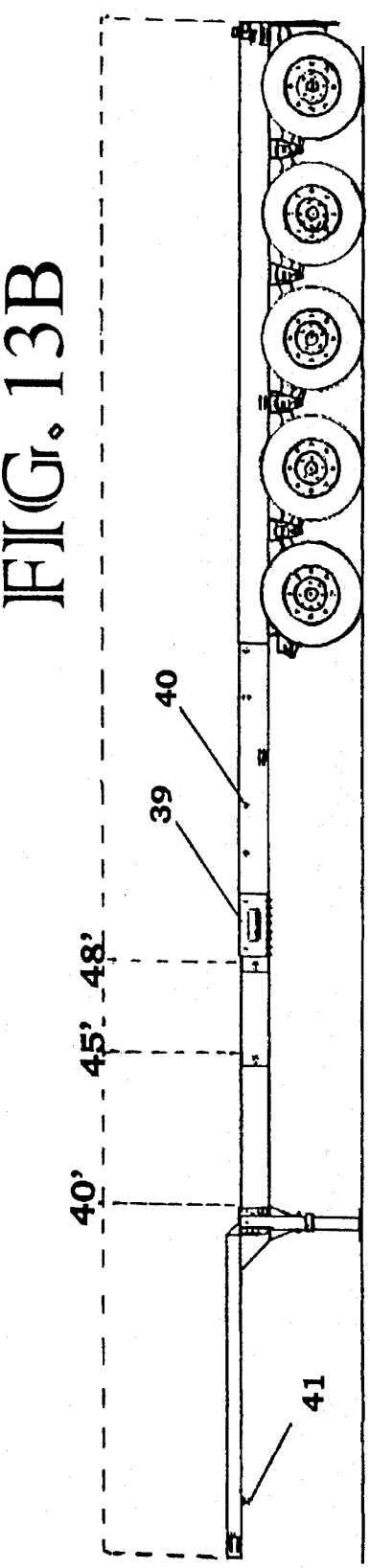

FIG. 13A, 13B depicts a top view (FIG. 13A) and an aligned (dashed vertical lines) side view (FIG. 13B) of a triflange 5-axle extendable goose-neck unibeam trailer chassis for hauling maximum weight containers and fitted with a mid-section slide to extend the chassis from 40-feet (40') to 45-feet (45') to 48-feet (48'), according to EXAMPLE 3, below. In the depiction the chassis is extended to its 48-foot overall length. The positions of the different locking pin holes (40) in the unibeam chassis (42) are depicted as is the relative position of the extendable channel slide (39).

DETAILED DESCRIPTION OF THE PREFERRED EMBODIMENTS

The problems in the art are herein recognized and solutions disclosed.

Traditional track trailer chassis construction, having dual longitudinal I-beams and lateral I-beams fastened at stations with welding (or bolts) and strengthened by gusset plates and angle irons, suffers from a number of disadvantages, enumerated above. The unibeam chassis construction of the instant invention solves the problems in the art by providing:

a) A chassis with strength where it is needed and weight is eliminated where it is not needed;

b) A unibeam chassis having the vertical beam strength necessary to carry heavy loads and able to sustain repeated flexing and side-loading during cornering and maneuvering by redistributing the load forces;

d) A relatively strong yet flexible long-lived trailer chassis that is simple to manufacture; and e) Relatively short 20-foot 3–5 axle chassis that meets Federal and State DOT regulations for carrying heavy loads (e.g., MWC) without extending length and compromising the trailer chassis integrity.

The subject improvements provided by the instant invention were achieved by the following means: namely, (i) Eliminating the traditional longitudinal and lateral I-beams in the art in favor of the welded unibeam construction depicted in FIGS. 2–13; and as described in detail below, particularly making reference to FIGS. 2,3, and 4A–4C.

(ii) Replacing the two traditional longitudinal I-beam upper flanges and the top lateral I-beam flange with a continuous strong single flange plate, termed herein a "uni-flange" (1);

(iii) Using a thinner gauge material to construct the uni-beam in the bridge span than that used in the neck and rear of the chassis thereby putting the necessary structural strength at each station and saving weight while retaining strength by cutting ports wherever structurally possible to reduce weight;

(iv) relieving side loading stress and bend by creating flexibility in the bridge span uni-beam, i.e., by fastening (e.g. welding) the lateral web members (5), to the longitudinal web (3) and to the uni-flange (1), but not fastening the lateral web members (5) along the longitudinal trailer axis to the longitudinal web (3) or the uni-flange (1);

(v) strengthening the rear axle (while maintaining low weight) by making the axle supports integral with the lateral web members (4,5) of the uni-beam construction; and, (vi) reducing the need for a massive trailer neck and bridge I-beam structure by [a] shortening the trailer chassis, [b] adding 3, 4, or 5 axles, [c] distributing stress, bend, and torsional loads using a unibeam construction (as discussed further below), [d] reducing forces on the chassis neck (i.e., stress, bend, and torsional forces) by moving the king pin under the front of the load, and [e] positioning the front (20) and rear bolsters (23) so that container loads are vertically directed onto the fifth wheel of the truck tractor and onto the rear trailer axles. Stress loading in container trailer chassis is also reduced by matching the container length to the trailer length so that the container helps to carry some of the vertical flex forces on the bridging beam.

Side-load and flex stress loads on I-beam trailer chassis are highly variable and difficult to calculate since they depend at least upon frictional forces of the rear tires with different kinds of surfaces, the sharpness and rate of the cornering, the number of rear axles, distance between the axles, size of the tires, distance between center of resistance of the rear axles and the front loading forces delivered onto the chassis by the truck tractor at the king pin, and the position of the different multiple lateral members in the chassis that resist the bending of the longitudinal I-beam. Suffice to say that the maximal bending load forces on 3-axle trailer chassis are strong enough to fracture chassis that are welded using 12–14 inch deep I-beams having a structural modulus of about ½ to ⅝ inches with 4-inch flanges. To compensate for weld and beam failure certain fabricators have increased the depth and structural modulus of the steel used in their I-beam chassis, and in the process added to the cost of manufacturing and operating.

The inventor sought an alternative solution to the problem. A hypothesis was put forth and an empirical approach of real-world testing was used to confirm the validity of the hypothesis: namely, it was believed likely that frame and weld failures in traditional I-beam trailer chassis were caused primarily by structural rigidity as well as by side-load forces during cornering and maneuvering. A design was conceived to create chassis flexibility and to distribute side-load forces. The first test bed that was fabricated and tested was a relatively stiff and inflexible I-beam prototype. The test-bed consisted of a retrofitted 20-foot twin axle I-beam container trailer chassis lengthened to 40-feet with an added third axle in the inventor's experience, a retrofitted 40-foot three-axle container trailer having the light I-beam construction (such as used in most 20-foot container trailers) will commonly experience weld and/or chassis fractures within about 1–3 years of use, particularly when used continuously to haul MWC. To test the working hypothesis, a continuous sheet of ⅛-inch 50K steel was cut to form a single top flange for the test bed. It was hoped that the side-load bending forces on one of the longitudinal members would be converted into compression forces and distributed through the continuous top flange into other parts of the chassis. The test bed was used experimentally by the inventor in real world conditions and watched to determine whether it would develop fractures on extended use in heavy hauling. The test-bed remains fracture free (to date) and, under the conditions of its use, it is believed likely that a traditional retrofitted I-beam trailer would have failed. Being encouraged by the initial results, a relatively light triple-axle 40-foot container chassis was constructed for hauling MWC using the prototype tri-flange design of the instant invention. The prototype chassis has been tested in relatively continuous use, under real world conditions, and remains fracture free (to date).

As used herein the following terms are intended to take meaning as follows: namely, "Uni-flange" is intended to mean that the subject chassis has at least one flange that is cut from a single contiguous sheet of material, and is fastened with its surface abutting either the top or the bottom edges of both the longitudinal and lateral web members. A representative uniflange (1) is depicted in FIGS. 2 and 3, where the surface of the uniflange (1) is fastened by welding to abut the top edges of the longitudinal web (3) and the lateral web (5).

"Unibeam" is intended to mean that the subject chassis has at least two longitudinal webs (3a, 3b), two lateral webs (5a, 5b), two longitudinal flanges (2a, 2b) one being fastened to each one of the two longitudinal webs (i.e., 3a or 3b, respectively), two lateral flanges (4a, 4b) one being fastened to each one of the two lateral webs (i.e., 5a or 5b, respectively), and a single continuous uniflange (1) being fastened to each of the longitudinal webs (3a, 3b) and to each of the lateral webs (5a, 5b). A fragmentary view of a portion of a representative unibeam chassis is provided in FIGS. 2 and 3 showing the respective orientations of the following members: namely, the longitudinal web (3), the lateral web (5), the longitudinal flange (2), the lateral flange (4) and the uniflange (1).

In the representation of FIGS. 2, 3, and 4A–4C the longitudinal web (3) is fastened at its lower surface to the longitudinal flange (2). In alternative embodiments, the longitudinal web (3) may be fastened eccentrically on the longitudinal flange (2), e.g. forming the L-beam The unibeam of the instant invention is constructed by aligning two longitudinal web (3)-longitudinal flange (2) subcomponents in a parallel orientation and the attaching the one-to-the-other by (i) fastening lateral flange (4) to longitudinal flange (2), and (ii) fastening uniflange (1) to the longitudinal web (3). Lateral web (5) may optionally be fastened to longitudinal webs 3a and 3b. In alternative embodiments, the vertical relationship of uniflange (1) and longitudinal flange (2) depicted in FIGS. 1–4 may be reversed so that the longitudinal flange (2) is on the top surface of the chassis and the uniflange (1) is on the bottom surface of the chassis. In other embodiments, (e.g., FIG. 12A, 12B, below) uniflange (1) may transition from a top surface in one portion of the chassis to a bottom surface. Optional gusset plates may be fastened to the chassis to strengthen the union of longitudinal webs (3a, 3b) with flanges (2a, 2b); or, lateral webs (5a, 5b) with longitudinal webs (3a, 3b); or, lateral webs (5a, 5b) with lateral flanges (4a, 4b).

Figure 1:
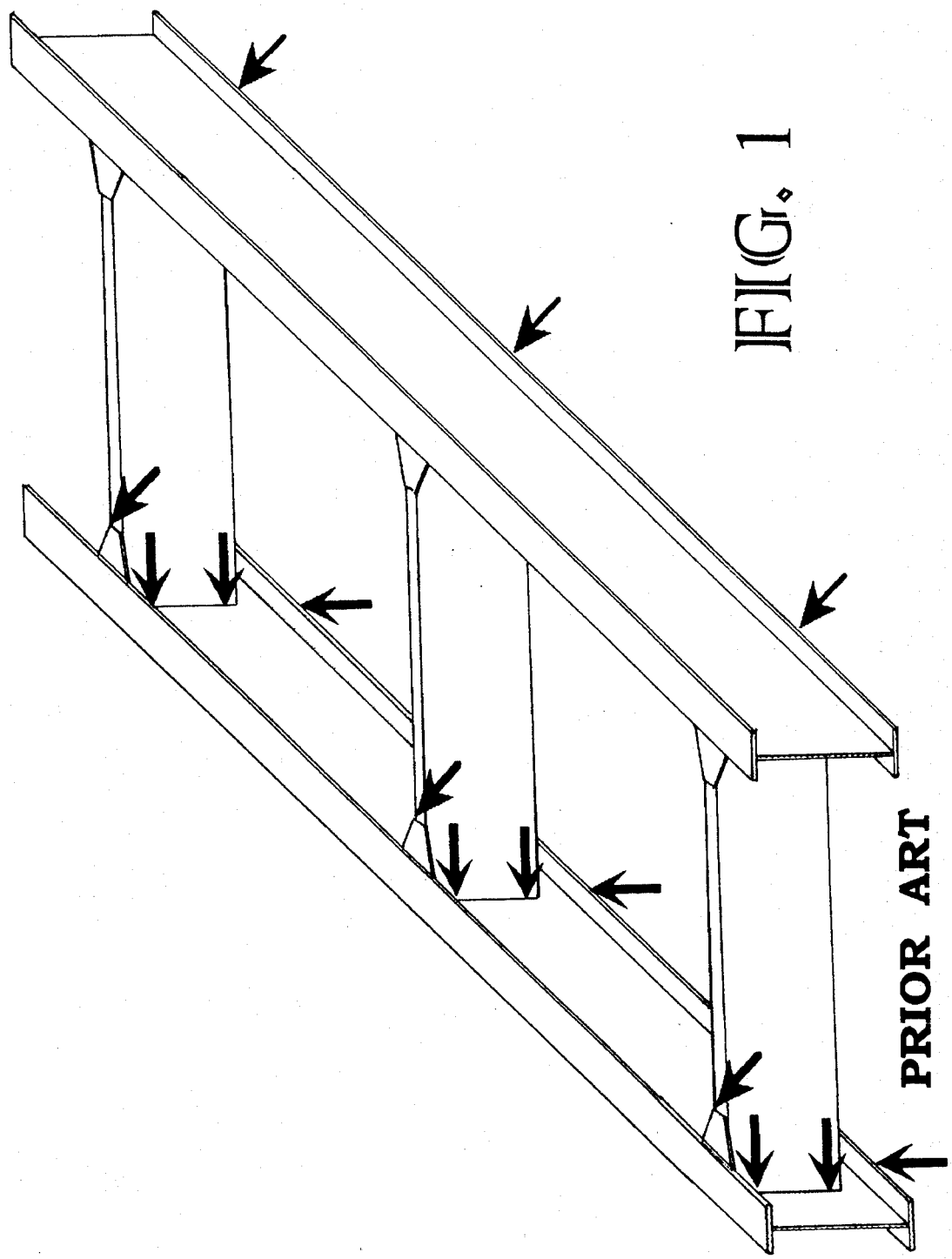
FIG. 1 depicts a portion of a conventional I-beam trailer chassis with arrows indicating where weld/and frame failures may appear.
Figure 2:
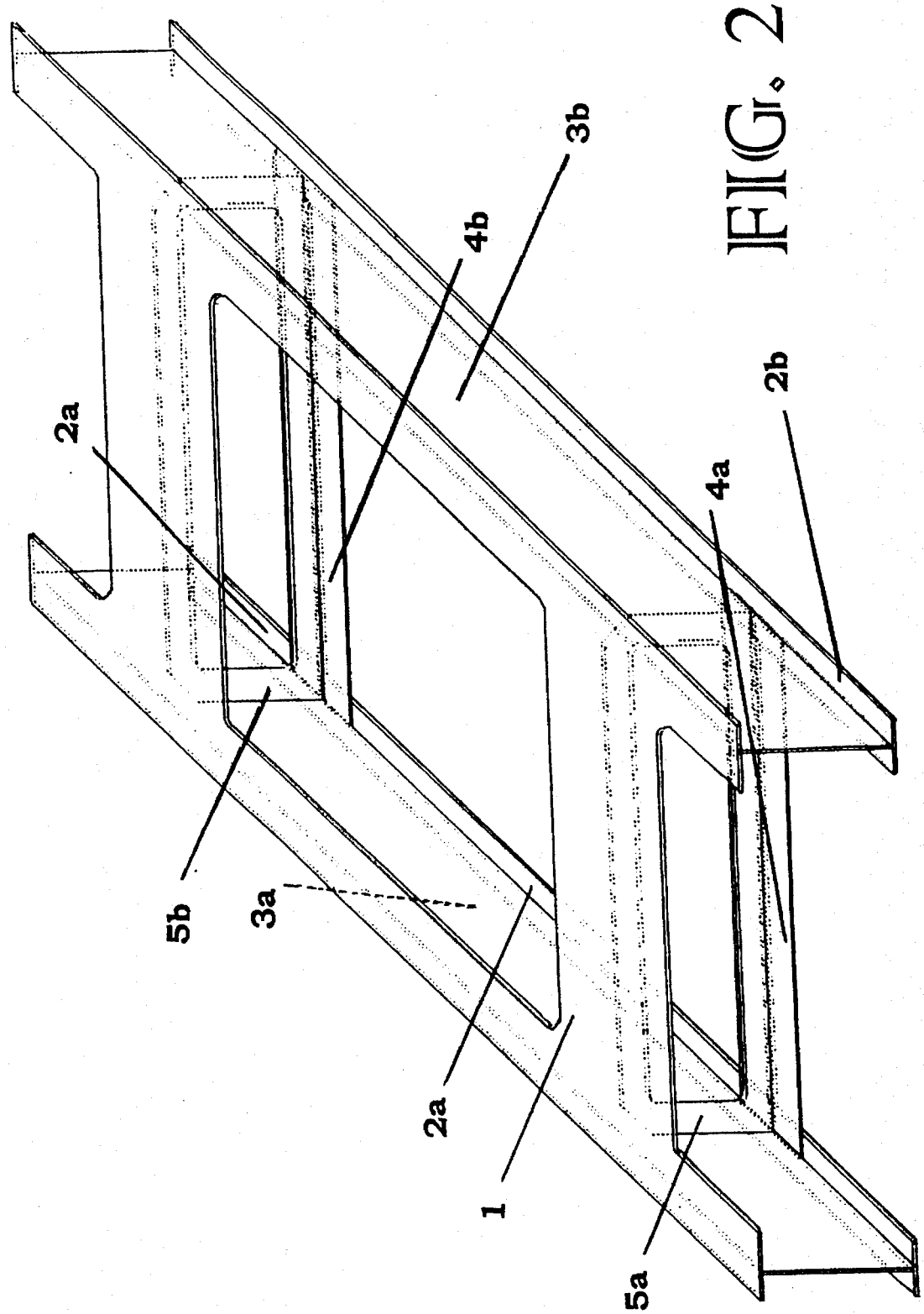
FIG. 2 depicts an isometric view of a portion of a tri-flange unibeam chassis looking down at an angle on the continuous uni-flange (1), ) across two stations where two lateral webs (5a, 5b) are present, and where the longitudinal flanges (2a,2b) and longitudinal web (3a,3b) are visible. Also depicted are portions of two lateral flanges (4a,4b).

Referring to FIG. 2, "Tri-flange" chassis is intended to mean a unibeam chassis consisting of two longitudinal webs (3a,3b), two lateral webs (5a, 5b), two longitudinal flanges (2a, 2b), and a single continuous uniflange (1). Each longitudinal flange (e.g., 2a, 2b) is fastened to a longitudinal web (i.e., 3a or 3b, respectively); each lateral flange (e.g., 4a, 4b) is fastened to a lateral web (i.e., 5a or 5b, respectively); and, a single continuous uniflange (1) is fastened to each of the longitudinal webs (3a,3b) and to each of the lateral webs (5a, 5b). A representational cross-sectional end view of an illustrative tri-flange unibeam truck trailer chassis is depicted in FIG. 4A showing the respective orientations of the two longitudinal webs (3a, 3b), the two longitudinal flanges (2a, 2b) and the continuous uniflange (1). The lateral web (5) and lateral flange (4) members (not depicted in FIG. 4A) are oriented between each of the longitudinal web members (3a, 3b) by fastening to the longitudinal flanges (2a, 2b) and to the uniflange (1), e.g., as depicted in FIGS. 2,3, 5A–5B, and 6).

Referring to FIG. 4B, "Quad-flange" chassis is intended to mean a unibeam chassis consisting of three longitudinal webs (3a, 3b, 3c), at least two lateral webs (5a, 5b; 5c), three longitudinal flanges (2a, 2b, 2c), and a single continuous uniflange (1). Each longitudinal flange (2a–2c) is fastened to each of the three longitudinal webs (i.e, 3a or 3b or 3c, respectively), and at least two lateral flanges (4a,4b) are oriented between the longitudinal webs and fastened to the longitudinal flanges (2a and 2b, or 2b and 2c, or 2c and 2d). Each longitudinal flange (e.g., 2a, 2b) is fastened to each of the two lateral webs (5a or 5b, respectively). A single continuous uniflange (1) is fastened to each of the longitudinal webs (3a, 3b, 3c) and to each of the lateral webs (5a, 5b, 5c). The representational cross-sectional end view of an illustrative quad-flange unibeam truck trailer chassis depicted in FIG. 4B shows the respective orientations of the three longitudinal webs (3a, 3b, 3c), the three longitudinal flanges (2a, 2b, 2c) and the continuous uniflange (1) fastened to each of the longitudinal webs (3a, 3b, 3c).

Referring to FIG. 4C, "Quint-flange" chassis is intended to mean a unibeam chassis consisting of four longitudinal webs (3a–3d), at least two lateral webs (5a[<m]ed, 5b; not depicted in FIG. 4C), four longitudinal flanges (2a–2d), and a single continuous uniflange (1). Each longitudinal flange (2a–2d) is fastened to a respective longitudinal web (3a–3d), at least two lateral flanges (4a, 4b) are oriented between the longitudinal webs and fastened to each of the two lateral webs (5a, 5b), and a single continuous uniflange (1) is fastened to each of the longitudinal webs (3) and to each of the lateral webs (5).

Figure 10A:
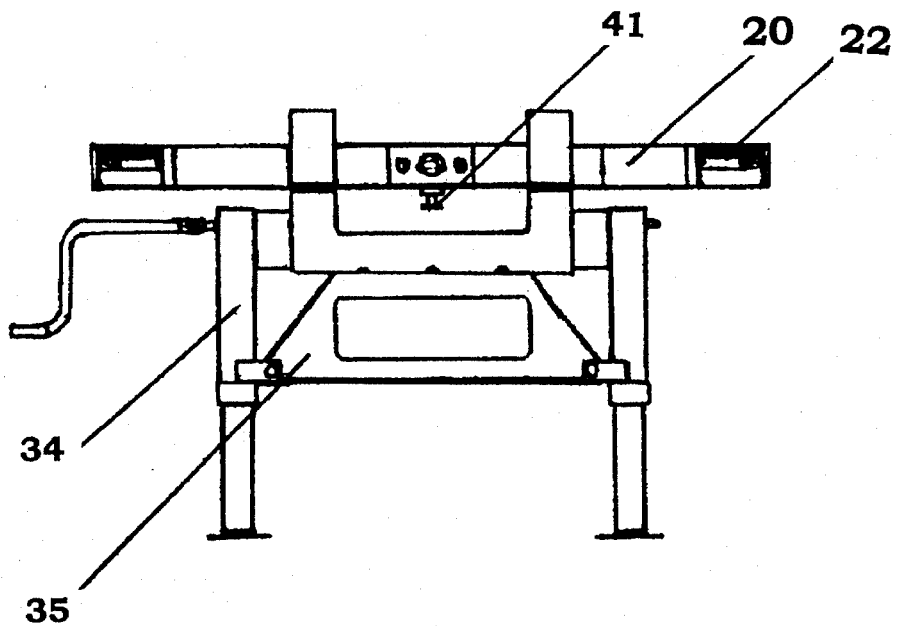
FIG. 10A, 10B depicts front and rear views of the chassis of FIG. 9A, 9B.
Figure 10B:
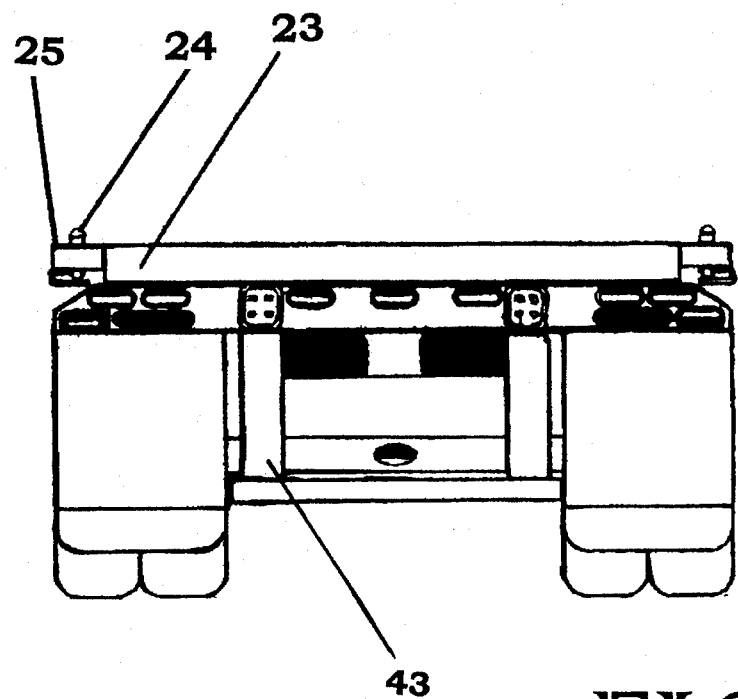

"Non-bridging unibeam trailer chassis" is intended to mean a truck trailer chassis designed for carrying a load on a unibeam chassis, wherein the front end of the load is positioned on the chassis in front of the king pin (41; FIG. 10A, 10B), and the king pin is positioned over the fifth wheel of the truck tractor. The subject chassis when constructed according to the instant invention does not require a specially strengthened trailer neck since the front end of the load is supported over the king pin.

Referring to FIGS. 7, 9A, 9B, 11 and 13A,13A "bridging unibeam trailer chassis" is intended to mean a truck trailer chassis designed for carrying a load on a unibeam chassis, wherein the front end of the load is positioned aft on the chassis from the king pin, and the king pin is positioned over the fifth wheel of the truck tractor. The subject chassis when constructed according to the instant invention contains a reinforced unibeam trailer chassis neck (31) member that is strengthened to support the front of the load, e.g., as depicted in FIGS. 12A–12C; FIG. 13A,13B. In preferred embodiments bridging unibeam trailer chassis are fabricated a reinforced trailer "neck member" (31), e.g. as depicted in FIGS. 7, 9A,9B, 11, and 13A,13B.

Referring to FIGS. 9A,9B and 10A,10B "Unibeam trailer chassis" is intended to mean a trailer chassis consisting of: (i) a front bolster (20); (ii) an optional neck chassis member (31) composed of a nose-section (47) and a mid-section (48); (iii) a mid-section chassis member (32); and, (iv) a rear chassis member (33) having a rear bolster (23) and 2 or more axles mounted thereon. In different alternative embodiments, the subject unibeam chassis (42) is constructed with a tri-, quad- or quint-flange unibeam. The type of unibeam may also vary in different parts of the chassis, e.g., FIG. 11 where a tri-flange unibeam transitions to a quad-flange unibeam. In certain preferred embodiments for bridging trailer chassis the neck chassis member (31) and rear chassis member (33) are fabricated according to the depictions provided in FIGS. 7–13. Representative examples of the subject unibeam trailer chassis are provided in the EXAMPLES, below.

"Neck chassis member" (31), also referred to interchangably herein as "neck" and "neck member", is intended to mean a unibeam chassis neck member (31) according to FIGS. 2–4, 9A,9B and 11.

Figure 6:
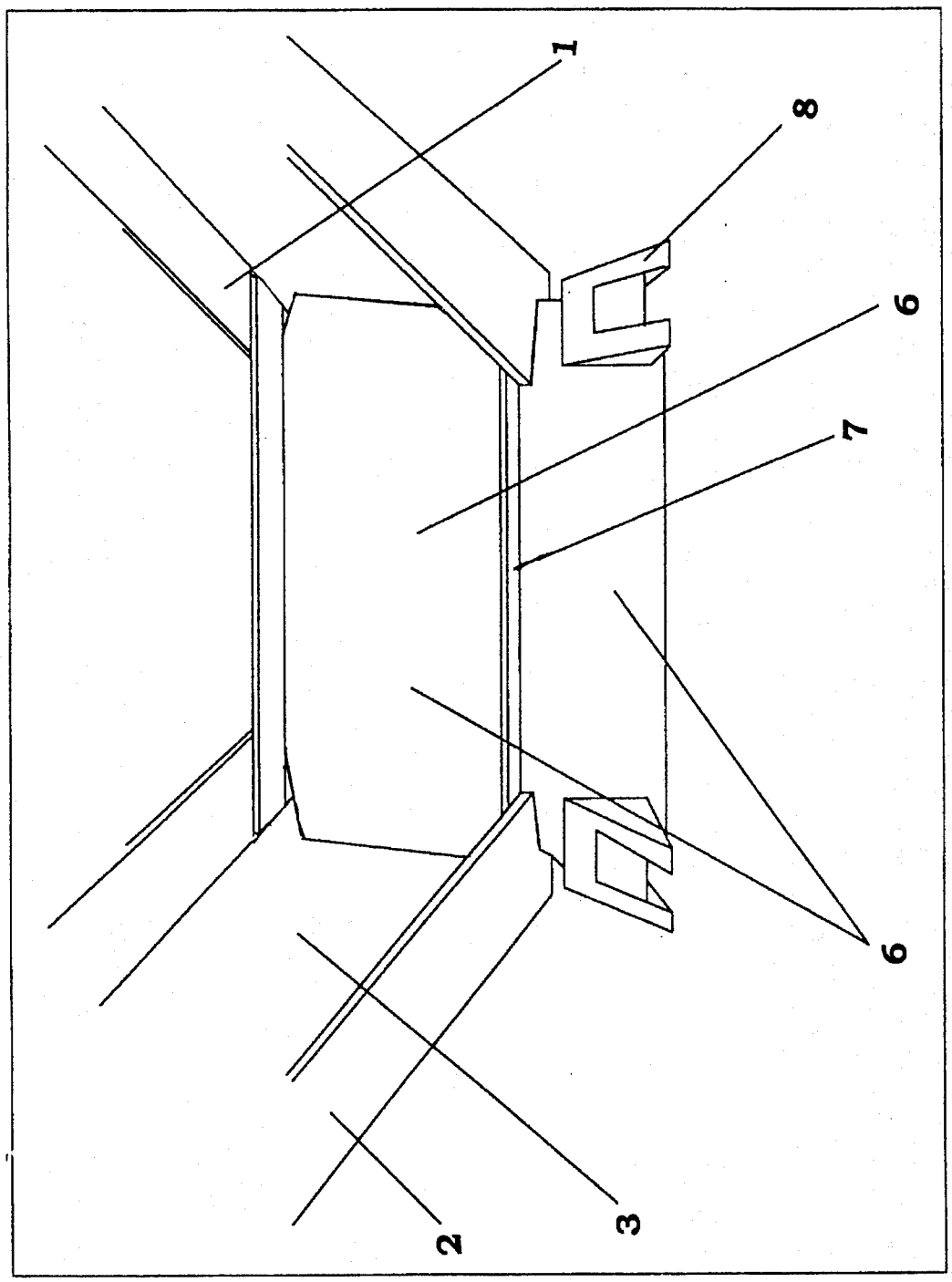
FIG. 6 schematically depicts a fragmented perspective of the lateral axle web (6) of FIG. 5A–5B in an isometric view, i.e., from below and slightly in front of the rear axle support station. The following are identified: namely, upper uniflange (1), lateral axle web (6), lateral axle flange (7), longitudinal web (3), longitudinal flange (2), and axle spring hanger (8). The lateral axle web (6) is continuous from its top, i.e., adjacent to unibeam (1), to its bottom, i.e., below the lower surface of longitudinal flanges (2).
Figure 7:
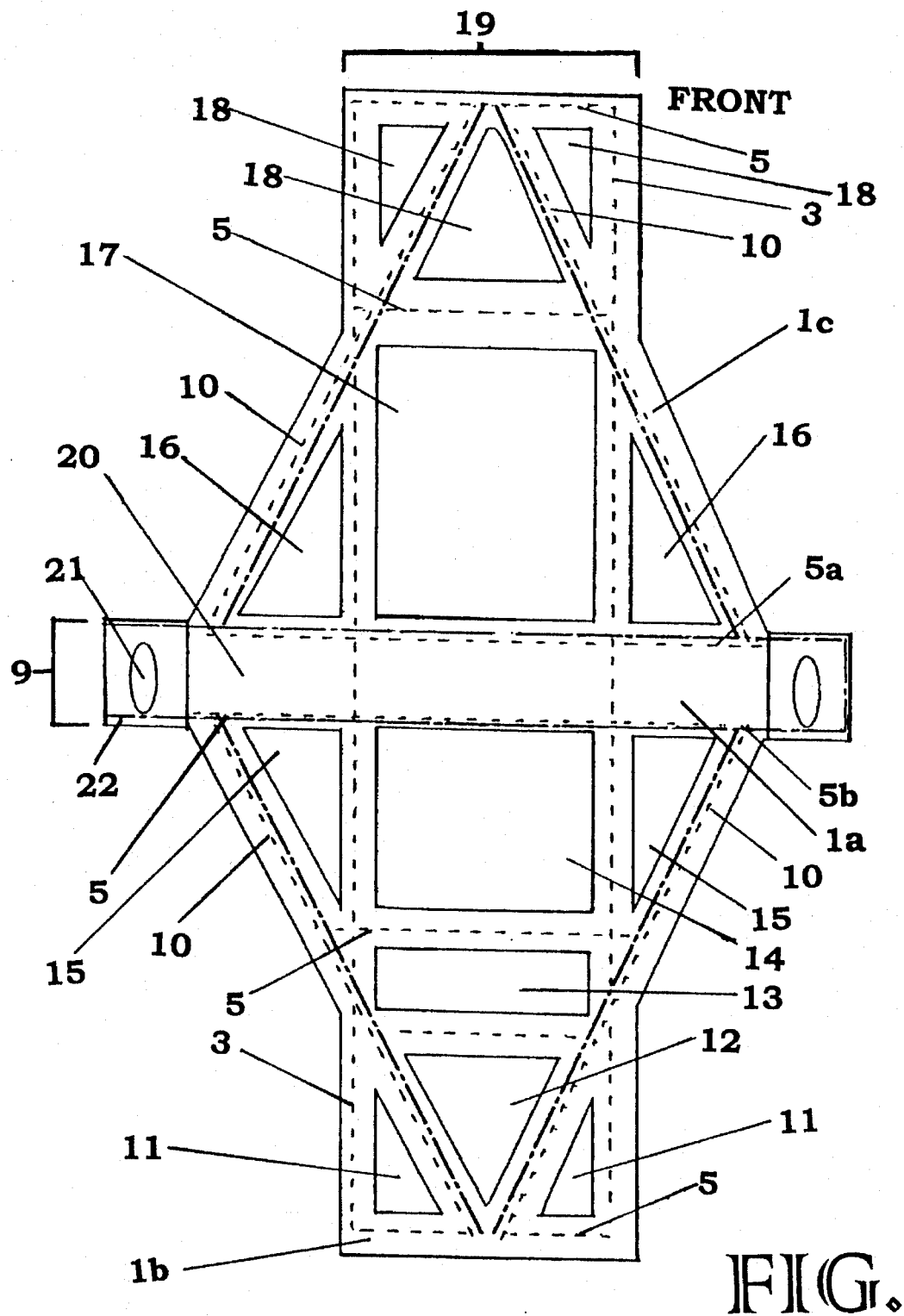
FIG. 7 schematically depicts a fragmented perspective view of the neck member of a flat-neck container trailer chassis looking down on the front (FRONT) surface of the during fabrication and before addition of the king pin and front bolster. Identified are the uniflange (1); longitudinal web (3; broken short segment verticle lines); lateral web (5; broken short segment horizontal lines); and transverse web (10; short and long segment broken lines). In the depiction the web members lie below the plane of view and are represented by the broken-dashed lines. Major structural components of the flat-neck are identified either by brackets, i.e., horizontal "box beam" (9) and vertical "rectangular frame member" (19), or in the case of the "diamond shaped member" it is identified using a broken line with the short and long segments wherein the apex of the diamond is located toward the top of the chassis depicted in the figure.

In one preferred embodiment according to FIG. 7, the neck member (31) has as components: (i) "rectangular-frame member" (19) with a lateral dimension and a longitudinal dimension; (ii) a "box-beam" (9) located at the mid-point of the longitudinal dimension and extending beyond the margins of the rectangular frame member; and (iii) a "diamond-shaped-frame member" extending laterally from the mid-point of the lateral dimension of the rectangular-frame member to the exterior surface of the box-beam The "rectangular-frame member" comprises a unibeam fabricated according to FIG. 4A–C. "Box-beam" (9) is constructed with at least two lateral webs (5a, 5b), two lateral flanges (4a, 4b) and a uniflange (1). The uniflange (1) is contiguous across the surface of the rectangular-frame, box beam, and diamond-shaped-frame members (FIG. 7). The box-beam (9) comprises the front bolster of the trailer chassis and mounted thereon at the two most lateral extremities are container fasteners (22) each of which has affixed a twist-lock or a hardened pin (21) for receiving and retaining the front edges of a shipping container. The "diamond-shaped frame member" comprises at least four transverse webs (10), four transverse flanges (not depicted in FIG. 7 but according to unibeam construction of FIGS. 2–6), and a uniflange (1c) that is continuous with both the uniflange (1a) rectangular-frame member and the uniflange (1b) of the box-beam The transverse webs (10) depicted in FIG. 7 are of the same size and orientation (i.e., perpendicular to the uniflange) as the lateral web (5a, 5b) members, and the transverse flange members are similarly identical in orientation (i.e., perpendicular to the transverse webs-10) and size to the lateral flanges (4a, 4b). Continuity between uniflanges 1a, 1b, and 1c may be from edge-fastening the one to the other (e.g., by but-welding the edges), but in the most preferred embodiment of the neck chassis member the subject uniflanges 1a, 1b, and 1c comprise a single continuous sheet of material. For reducing weight of the chassis it is preferred that portions of the chassis that are not required for structural integrity be removed, i.e., the optional cut-out portions (11–17) depicted in FIG. 7. Cut-out portions are termed herein "ports", and their purposes are primarily to reduce weight, and provide access for electrical wiring and brake lines. (Representative illustrations of "ports" and their use for reducing weight are disclosed further below.)

Figure 9A:
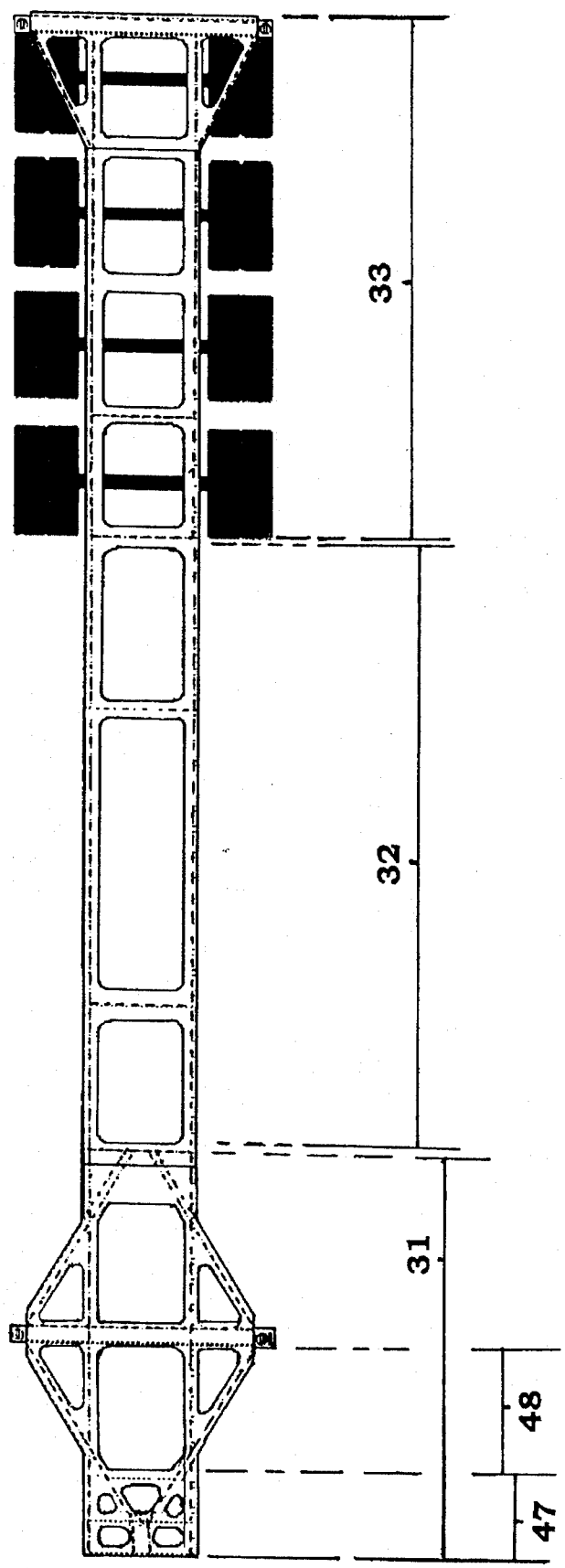
FIG. 9A and 9B depicts a top view aligned with a side view of the 46.5 foot (overall length) flat-neck bridging unibeam chassis after mounting four rear axles and wheels. The side view depicts the three major chassis structural components, namely, the neck member (31), the mid-section (32) and the rear chassis member (33), along with the relative positions (left to fight) of the king pin (41), neck twist lock (21), landing gear strut (37), landing gear mounting tube (34), axle spring hanger (8), and rear twist lock (24). For purposes of description only, the neck member (31) is subdivided into a nose section (47) and a mid-section (48). Dashed verticle lines depict the alignment from the top view (FIG. 9A) to the side view (FIG. 9B).
Figure 9B:
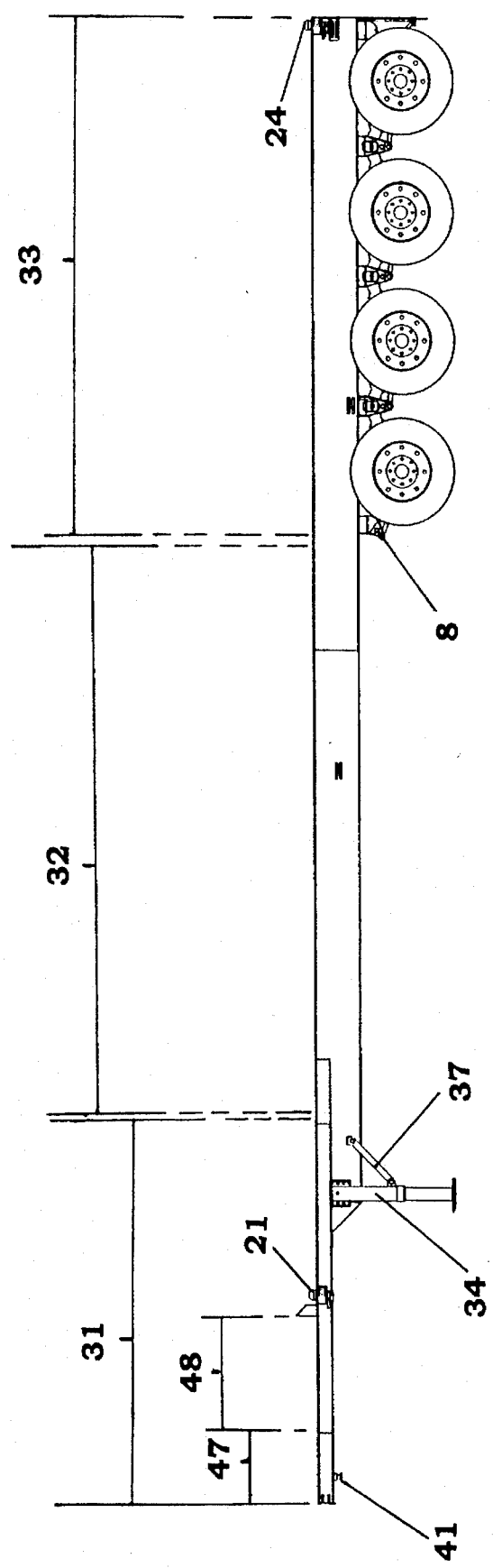

Making reference to FIG. 9A,9B "mid-section member" (32) is intended to mean that portion of the chassis that is located between the neck chassis member and the rear chassis member. The mid-section member comprises at least two longitudinal webs (3a,3b), two longitudinal flanges (2a,2b), two lateral webs (5a,5b), and a single continuous uniflange (1) that is continuous with both the uniflanges of the neck chassis member and of the rear chassis member.

"Rear chassis member" (33) is intended to mean that portion of a unibeam chassis that begins at the first lateral axle web (6) and ends at the rear of the trailer chassis.

Figure 5A:
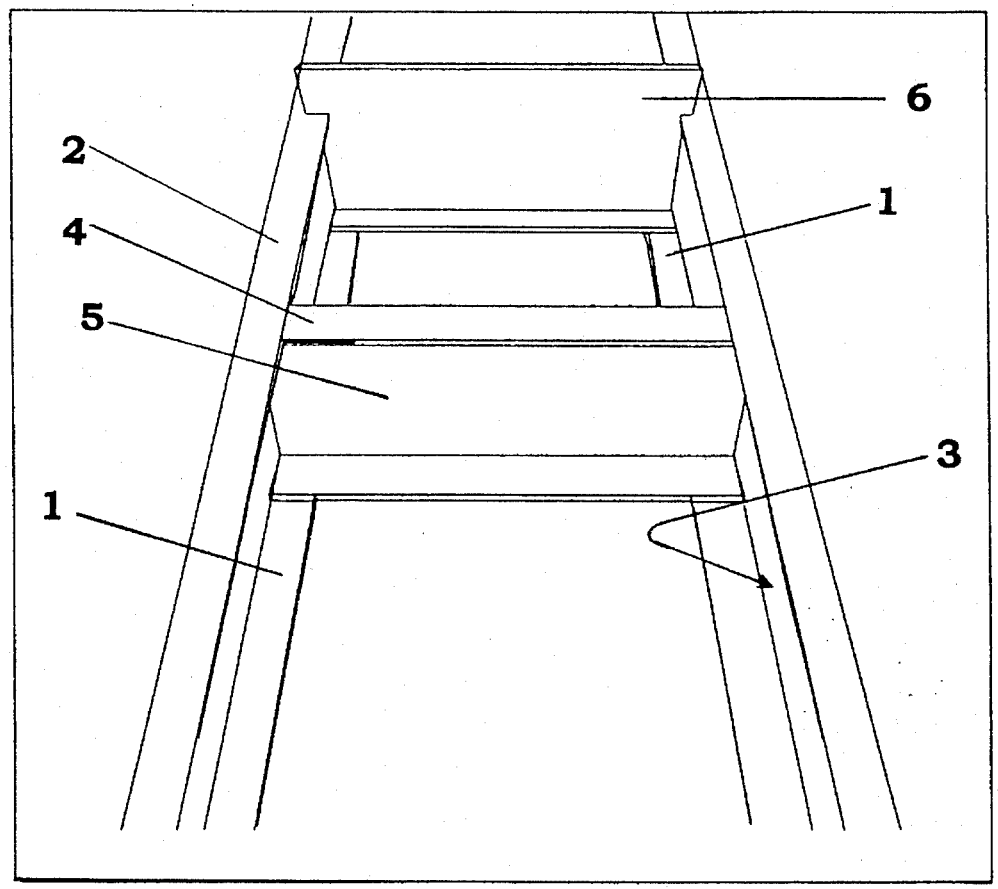
FIGS. 5A and 5B schematically depicts two fragmented perspective views of an upside down tri-flange unibeam chassis at a rear axle support station at two different stages in construction.
Figure 5B:
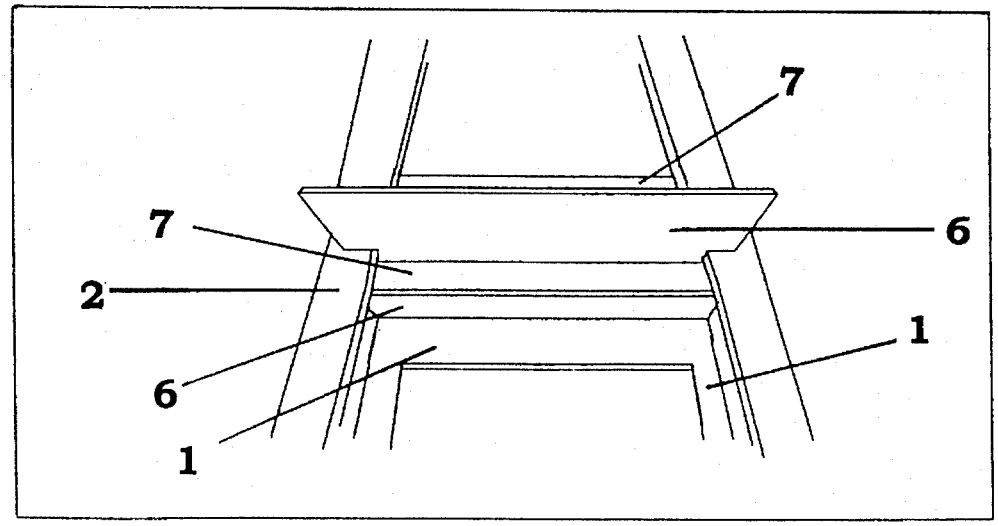

In a preferred embodiment, the rear chassis member (33) is fabricated according to FIG. 8; as instructed below. The rear chassis member (33) comprises a unibeam (42) support member" comprising two or more lateral axle webs (6; FIGS. 5A–5B) for hanging the springs and rear axles. An illustrative tri-flange unibeam "axle support member" is depicted in FIGS. 5A–5B and 6.

Making reference to the rear chassis member (33), the tri-flange unibeam depicted in an end-view in FIG. 4A and in a top view in FIG. 5A, the axle support member comprises the following: namely, a lateral axle web (6) member, fastened at its top edge to the uniflange (1) and lateral edges to the longitudinal webs (3a,3b), extending beyond the lower edge of the longitudinal flanges (2a, 2b) and abutting the lower longitudinal flange (2). The lateral axle web (6) is stiffened and strengthened (FIG. 5B), by two supporting lateral axle flanges (7), one fastened on each side of the lateral axle support web (6). The axle support member is stiff, but light, and after attaching axle spring hangers (8; FIG. 6), the support member serves as an anchorage point for each of the trailer axles (e.g., see FIGS. 10A,10B–11).

Figure 8:
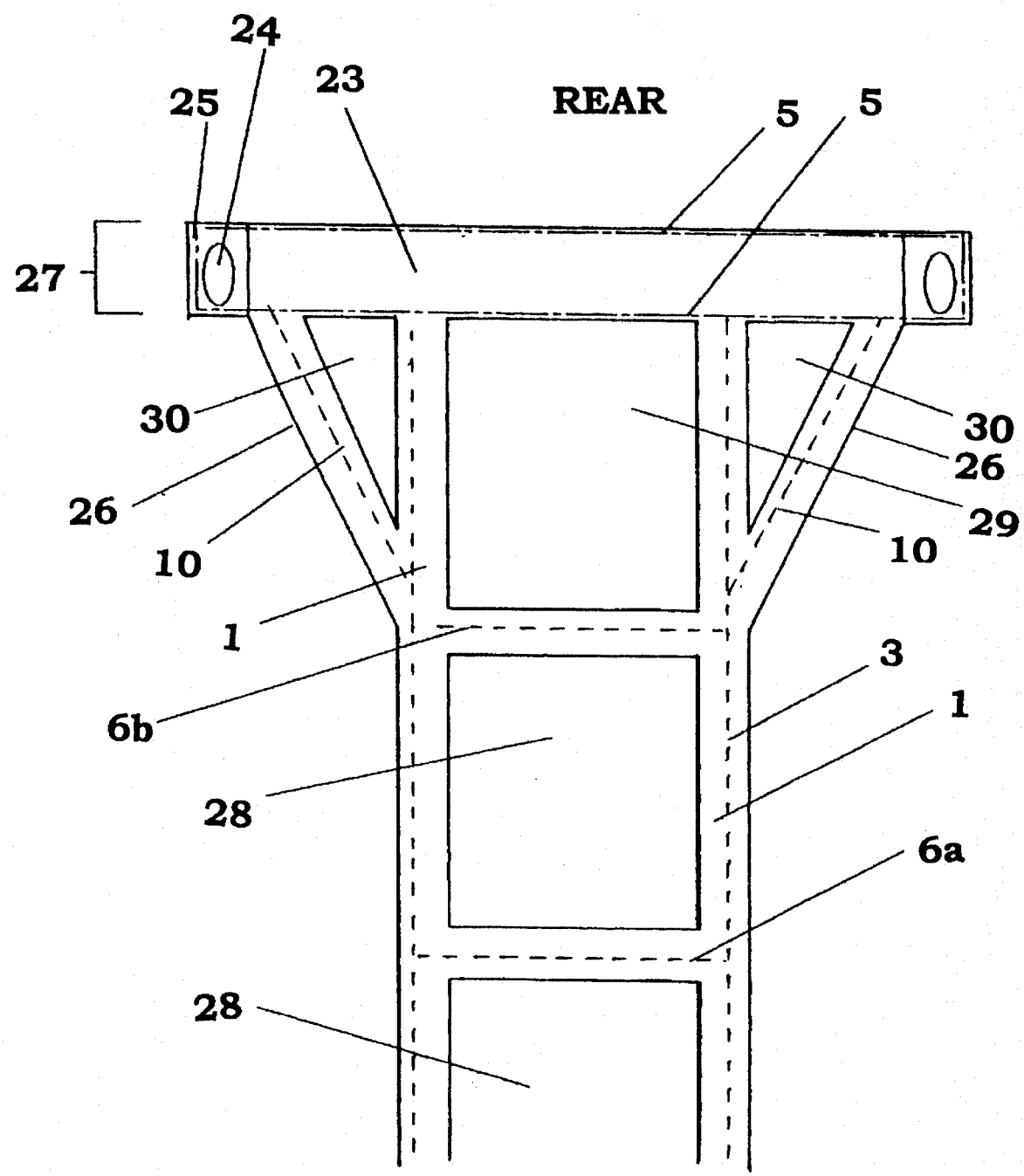
FIG. 8 schematically depicts a fragmented top view of a rear chassis member (33; REAR) of a container trailer during fabrication and before addition of the axle hangers of FIG. 6. Identified in the depiction are uniflange (1), longitudinal web (3), lateral web (5), and transverse web (10). The web members lie below the plane of view and are represented/broken-dashed lines.

According to the rear chassis member design of FIG. 8, the two longitudinal unibeams comprising the chassis and the two lateral axle supports (6a, 6b), attached to the rear bolster (23), comprise a "box beam" (27) and is stiffened and strengthened using two lateral unibeams (26), each of which contains a transverse web (10; having a transverse flange) that is fastened to the uniflange (1). The rear bolster (23) is equipped with container fasteners (25) having twist locks (24).

Optional ports such as depicted in FIG. 7 (e.g., 11–18) or in FIG. 8 (e.g., 28–29) may be cut into the uniflange, (or longitudinal,3 or lateral,5 webs), to reduce the weight of the chassis (providing of course that sufficient structural integrity is maintained in the remaining material). In the most preferred embodiment the material so removed leaves a continuous uni-flange width of about 4 inches to about 12 inches centered over each of the lateral (5) and longitudinal (3) web members. Skilled artisans will recognize that the width of the uni-flange may be determinative of the overall bending moment and torsional forces that can be deflected by a unibeam without breaking. Thus, increasing the width of the uniflange at different points in a trailer chassis may be desirable so that strength is achieved where needed. Conversely, decreasing width may be desirable at other stations in the chassis where flexibility and low weight is desirable. It will also be appreciated that chassis designed to haul different load limits may have different uniflange widths.

Embodiments of the invention provide unibeam truck trailer chassis, unibeam neck chassis members, unibeam rear members, and unibeam axle support members all of which are strong, stiff, flexible but light, and suitable for hauling maximum weight loads (e.g., MWC). The particular advantage offered by the chassis of the instant invention is the flexibility and capability of distributing side load forces including flex, torsion, and bend stresses from the longitudinal members into other portions of the chassis.

Other particular advantages conferred by the instant invention provide lighter, stronger, flexible chassis that find a variety of uses. The unibeam chassis of the instant invention, while taking its preferred uses in truck trailers for hauling heavy load, also finds uses in situations where side-load bending forces on frame members need to be relieved, e.g., in automobiles, trucks, camping trailers, motorhomes, flat bed truck trailers, goose neck truck trailers, bridging and non-bridging truck trailer chassis including truck van trailers.

Cutting of the components needed for assembly of a unibeam truck chassis is next disclosed, followed by materials and assembly and fabrication methods. In preferred embodiments, the uni-flange (1) and longitudinal webs (3) are cut from sheets of material that are fastened together at their edges to form a continuous longitudinal sheet that spans the length and width of the top of the chassis and length of the chassis. In the preferred embodiments, the uniflange is a single continuous sheet that spans the entire length (e.g., 40–48 feet) and width of the chassis. In other preferred embodiments, where reducing trailer chassis weight is an object, the uniflange of the neck chassis member (31), mid-section (32), and rear chassis members (33) are of a differing thickness. (Direction is provided below as to the thickness of materials.)

The uniflange is preferably cut from a single sheet of material about 20–40 feet in length and about 7 feet in width. Cutting of the component parts of the chassis may be accomplished by acetylene torch, preferably by laser, but most preferably by water-cut using a high velocity water jet filled with an abrasive/eluting compound. Water-cutting minimizes distortion of the material, and is cost effective with the capability of cutting up to three thickness of sheets simultaneously.

In one alternative embodiment, the top and side chassis members are continuous and formed by rolling, bending or stamping a sheet of material. In the latter embodiment, the uniflange (1) and longitudinal flanges (3a,3b) of a tri-flange unibeam are continuous, so formed by rolling, stamping or bending the single sheet of material into a continuous longitudinal web-uniflange-longitudinal web member.

In embodiments having a uniflange (1) that is made up of sheets of material that are edge-joined to form a continuous sheet, it is preferred that each of the uniflange component sheets so joined be about ¼ to about ⅓ of the total length of the trailer chassis. In one illustrative example, the first ⅓ of the trailer chassis length comprises the neck chassis member, the second-⅓ of the length the mid-section, and the last-⅓ of the length comprises the rear chassis member. Most preferably, the entire trailer chassis length comprises a plurality of single continuous longitudinal flanges (2) and continuous longitudinal webs (3).

It is currently preferred that the width of all the longitudinal flanges (2a,2b) and all the lateral flanges (4a,4b) be about 4 inches in width, because this width is currently an industry standard for receiving a variety of bolt-on trailer components, e.g., Gensets and the like.

Skilled artisans will appreciate that the depth of the plurality of longitudinal (3) and lateral (5) web members can be altered according to the use intended. While it is currently preferred that all the longitudinal web members be of the same depth within the mid-section (32) of the trailer chassis, variations in depth in this section and in the neck-(31) and rear-chassis members (33) are anticipated and disclosed herein. Skilled artisans will appreciate that the preferred depth of the web and thickness of the material used in the webs (3) and flanges (1,2,4) may vary according to the intended load of the chassis, as well as the strength required at different stations within the chassis.

The following example of materials and their thickness is provided for illustrative purposes only, and should not be considered to so limit any particular embodiments of the invention: namely, In a 2–3 axle 20-foot unibeam chassis for carrying heavy containers (i.e., up to 40,000 lb.), the uniflange (1) and longitudinal (2) and lateral flanges (4) are all cut from a single sheet of 5/16-inch thick 50K steel, and the longitudinal and lateral webs have a depth that is presently preferred to be about 18 to 20 inches In a 2–3 axle 20-foot unibeam chassis for carrying standard containers (i.e., about 10–30,000 lbs.), the uniflange (1) and longitudinal (2) and lateral flanges (4) are all cut from a single sheet of 5/16-inch thick 50K steel and the preferred depth of the webs (3,5) is presently preferred to be about 12 to 14 inches;

In a bridging 3–4 axle 41-foot long chassis (i.e., for hauling MWC of about 65,000 lbs.), material for the uniflange (1) and longitudinal (2) and lateral flanges (4) is preferably 70K formable steel having a thickness in the first ⅓ of the chassis length of about 5/16-inches thick; in the middle ⅓ of the chassis length 3/16-thick; and, in the rear ⅓ of the chassis 5/16-inch thick steel; and the depth of the webs (3,5) is presently preferred to be about 18 to 20 inches;

In a bridging 3–4 axle 40–46 foot long standard chassis (i.e., for hauling loads of about 40,000 lbs), material for the uniflange (1) and longitudinal (2) and lateral flanges (4) is preferrably 50K Corten steel having a thickness in the first ⅓ of the chassis length of about 5/16-inches thick; in the middle ⅓ of the chassis length 3/16-thick; and, in the rear ⅓ of the chassis 5/16-inch thick steel; and the depth of the webs (3,5) is presently preferred to be about 12 to 16 inches;

In a 3–5 axle 46-foot long chassis having a 6-foot neck (31) and a bridge span (i.e., mid-section, 32) of about 40 feet, material for the uniflange (1) and longitudinal (2) and lateral flanges (4) in the front ⅓ of the chassis is about ⅜-inch to about ½-inch 70K steel; in the middle ⅓ of the chassis length ¼-inch to about ⅜-inch thick 50K or 70K steel; and, in the back ⅓ of the chassis is again about ⅜-inch to about ½ inch 50K or 70K steel. Web (3,5) depth in this chassis is presently preferred to be about 14–16 inches.

In a 4–5 axle 46-foot long MWC chassis having a 10-foot neck (31) and a bridge span (i.e., mid-section, 32) of about 36 feet, (i.e., for hauling loads of about 76,000 lbs.) material for the uniflange (1) and longitudinal (2) and lateral flanges (4) in the from ⅓ of the chassis is about ⅜-inch to about ½-inch 90K/TI steel throughout and presently preferred depth for the webs (3,5) is 18–20 inches.

Materials for construction of alternative unibeam chassis embodiments of the invention are also envisaged including at least chrome-moly steel, sheet stainless steel alloys, and a variety of sheet aluminum containing alloys.

The distance between the stations at which transverse web members (4,5) are mounted also varies in different embodiments of the invention and is a matter of intended use(s) for the subject chassis. Commonly, in container trailer chassis the distance between a first and a second lateral web (4,5) is about 30-inches to about 72-inches, and the distances between may vary at different positions within the unibeam chassis. Representative examples are as follows: namely, In a 46-foot long bridging unibeam container chassis the distance between stations 0–1, 1–2, and 2–3 is about 72-inches; between 3–4, 4–5, 5–6, and 6–7 is about 48-inches;

In a 20-foot chassis for MWC the distance from station 0-1 and 3-4 is about 36–48 inches and from station 1-2 and 2-3 is about 72–96 inches; and, In the bridging extendable goose-neck chassis of FIG. 13 the neck member (31) is about 6–8 feet long, and the distance from stations 0-1, 1-2, and 2-3 is about 30–48 inches; from station 4-5 and 6-7 is again about 30–48 inches.

The overall chassis width of different embodiments of the invention may also vary according to the intended use of the chassis, i.e., representative examples include the following: namely, In a chassis for hauling shipping containers including MWC, the chassis is commonly about 40–42 inches wide in the mid-section (32) and 84 inches wide across the from bolster (20) and rear bolster (23); and, In a flat bed, van, or drop-neck maximum-width chassis, the width overall is about 96–102 inches, and the distance between two outermost longitudinal webs (3) is about 88–98 inches.

Fabrication of a tri-flange unibeam chassis (depicted in FIG. 4A) may be accomplished in an upside-down manner by laying out a uniflange (1) on the surface of a jig that is flat and true and has support members to hold the two longitudinal webs (3) parallel to one another and perpendicular to the jig surface. Most preferably, the subject uniflange (1) and longitudinal webs (3a,3b) are welded together using a continuous weld bead, however, in alternative embodiments angle-iron brackets may be welded to the different members and they may bolted, screwed or riveted together using suitable fasteners. After fastening together the uniflange (1) and the two longitudinal webs (2a, 2b), the lateral webs (5) are oriel between the longitudinal webs (3a, 3b) and fastened in place so that they are also perpendicular to the uniflange (1) and abuting the inner surface of each of the two longitudinal webs (3a,3b). Next, the lateral flanges (4) and longitudinal flanges (2) are positioned and then fastened perpendicular to the respective webs (3,5) and approximately parallel to the surface of the uni-flange (1). For mounting the lateral webs (5) and it may be convenient to turn the chassis assembly either on its side, or upside down. According to depiction in FIG. 6, in the rear chassis member (33) lateral axle webs (6) are fastened in place, followed by fastening of two lateral axle flanges (7), i.e., one on each side of the lateral axle web (6). The axle springs and rear axle assembly are next fastened to the axle spring hangers (8). In bridging trailers with a neck (31), a lateral landing gear web (35) is fastened in place, and is supported by fastening it to a lateral landing gear flange (36) that is in turn fastened to longitudinal flanges (2) on two adjacent unibeams. Landing gear mounting tubes (34) and their supporting and strengthening struts (37) are fastened to the outer longitudinal web (3) surface of the neck unibeams, and to the edge of the lateral landing gear web (35).

Representative examples of axle springs that may be affixed to the subject unibeam chassis include H 7700 2-leaf weight saver springs with axles that are about 5-inch in diameter with a capacity of 20,000 lbs. each. Wheels are commonly 20" diameter, hub piloted with oil seal hubs. Brakes are commonly drum-type that are hydraulically or pneumatically actuated. Landing gear is commonly of a design such as Holland LG-75 H-Duty 2-Speed. The rear bumper is DOT approved. The king pin is commonly about 2-inch S.A.E., heat treated. The length of the chassis is variable, as disclosed above; width is commonly about 96 inches (DOT); height from the ground to the top of the chassis is commonly 49 inches and king pin height 48 inches. Lashing locks for container chassis are commonly 2 twist locks (24) mounted on the rear bolster (23) with 2 hardened pins (21) mounted on the neck (20). Typically, super-weight trailer chassis for MWC are hauled by truck tractors having three rear axles (e.g., a lietable third axle) and 20-feet between the front and the first rear axle.

Representative examples of different embodiments of the subject unibeam chassis, along with their approximate chassis weight, and load capacity (i.e., according to the Federal Bridge Formula; FBF) are presented in TABLE 1, below.

TABLE 1

Approximate Weight (in pounds) of Different Length (in feet) Unibeam Chassis for Hauling Different Loads

| Axles No. ("N") | Inter-axle Length ("L") | Chassis Type Bridging (Telescope)* | Approx. Weight Unibeam Chassis | Allowable FBF Gross Wt. Load | Wash. St. DOT Load + Chassis Gross Wt. |
|---|---|---|---|---|---|
| 2 | 20 | No | 3,500 | 50,000 | 40,000 |
|   | 40 | No | 6,500 | 70,000 | " |
|   | 45 | Opt. | 6,750 | 75,000 | " |
|   | 48 | Opt. | 7,000 | 78,000 | " |
|   | 40 | Opt. (T) | 8,500 | 70,000 | " |
|   | 45 | Opt. (T) |  | 75,000 | " |
|   | 48 | Opt. (T) |  | 78,000 | " |
| 3 | 40 | No | 8,500 | 66,000 | 60,000 |
|   | 45 | Opt. | 9,000 | 69,750 | " |
|   | 48 | Opt. | 9,250 | 72,000 | " |
|   | 40 | Opt. (T) | 10,000 | 66,000 | " |
|   | 45 | Opt. (T) |  | 69,750 | " |
|   | 48 | Opt. (T) |  | 72,000 | " |
| 4 | 40 | No | 10,000 | 68,667 | 68,500 |
|   | 45 | Opt. | 10,500 | 72,000 | 72,000 |
|   | 48 | Opt. | 10,750 | 74,000 | 74,000 |
|   | 40 | Opt. (T) | 11,500 | 68,667 | 68,500 |
|   | 45 | Opt. (T) |  | 72,000 | 72,000 |
|   | 48 | Opt. (T) |  | 74,000 | 74,000 |
| 5 | 40 | No | 11,500 | 73,000 | 73,000 |
|   | 45 | Opt. | 12,000 | 76,125 | 76,000 |
|   | 48 | Opt. | 12,250 | 78,000 | 78,000 |
|   | 40 | Opt. (T) | 13,000 | 73,000 | 73,000 |
|   | 45 | Opt. (T) |  | 76,125 | 76,000 |
|   | 48 | Opt. (T) |  | 78,000 | 78,000 |
| 6 | 40 | No | 11,500 | 78,000 | 78,000 |
|   | 45 | Opt. | 12,000 | 81,000 | 81,000 |
|   | 48 | Opt. | 12,250 | 83,000 | 83,000 |
|   | 40 | Opt. (T) | 13,000 | 78,000 | 78,000 |
|   | 45 | Opt. (T) |  | 81,000 | 81,000 |
|   | 48 | Opt. (T) |  | 83,000 | 83,000 |
| 7 | 40 | No | 11,500 | 83,333 | 83,500 |
|   | 45 | Opt. | 12,000 | 86,250 | 86,000 |
|   | 48 | Opt. | 12,250 | 88,000 | 88,000 |

TABLE 1-continued

Approximate Weight (in pounds) of Different Length (in feet)
Unibeam Chassis for Hauling Different Loads

| Axles No. ("N") | Inter-axle Length ("L") | Chassis Type Bridging (Telescope)* | Approx. Weight Unibeam Chassis | Allowable FBF Gross Wt. Load | Wash. St. DOT Load + Chassis Gross Wt. |
|---|---|---|---|---|---|
| | 40 | Opt. (T) | 13,000 | 83,333 | 83,500 |
| | 45 | Opt. (T) | | 86,250 | 86,000 |
| | 48 | Opt. (T) | | 88,000 | 88,000 |
| 8 | 40 | No | 11,500 | 88,857 | 89,000 |
| | 45 | Opt. | 12,000 | 91,714 | 91,500 |
| | 48 | Opt. | 12,250 | 93,429 | 93,500 |
| | 40 | Opt. (T) | 13,000 | 88,857 | 89,000 |
| | 45 | Opt. (T) | | 91,714 | 91,500 |
| | 48 | Opt. (T) | | 93,429 | 93,500 |
| 9 | 40 | No | 11,500 | 94,500 | 94,500 |
| | 45 | Opt. | 12,000 | 97,313 | 97,500 |
| | 48 | Opt. | 12,250 | 99,000 | 99,000 |
| | 40 | Opt. (T) | 13,000 | 94,500 | 94,500 |
| | 45 | Opt. (T) | | 97,313 | 97,500 |
| | 48 | Opt. (T) | | 99,000 | 99,000 |

*Telescoping chassis, expandable from 40-feet, as disclosed above; Bridging chassis, above, opt. = optional It is intended that the following examples will serve to representatively illustrate, but not limit, the embodiments of the invention.

EXAMPLE 1

Non-bridging 40–43-Foot TrioFlange Unibeam Trailer Chasis for Hauling Maximum Weight Containers FIG. 9A,9B depicts an aligned top view (FIG. 9A) and side view (FIG. 9B) of the 46.5 foot (overall length) bridging unibeam chassis after mounting four rear axles and wheels. The side view depicts the three major chassis structural components, namely, the neck member (31), the mid-section (32) and the rear chassis member (33), along with the relative positions (left to right) of the king pin (41), neck twist lock (21), landing gear strut (37), landing gear mounting tube (34), axle spring hanger (8), and rear twist lock (24). For purposes of description only, the neck member (31) is subdivided into a nose section (47) and a mid-section (48).

FIG. 10A,10B depicts front (FIG.10A) and rear (FIG. 10B) views of the chassis of FIG. 9.

FIG. 10A depicts the relative positions indicated for the king pin (41), front bolster (20), container fastener (22), landing gear mounting tube (34) and lateral landing gear web (35). FIG. 10B depicts the relative positions of the DOT bumper (43), rear bolster (23), container fastener (25), and twist lock/pin (24).

EXAMPLE 2

Figure 11:
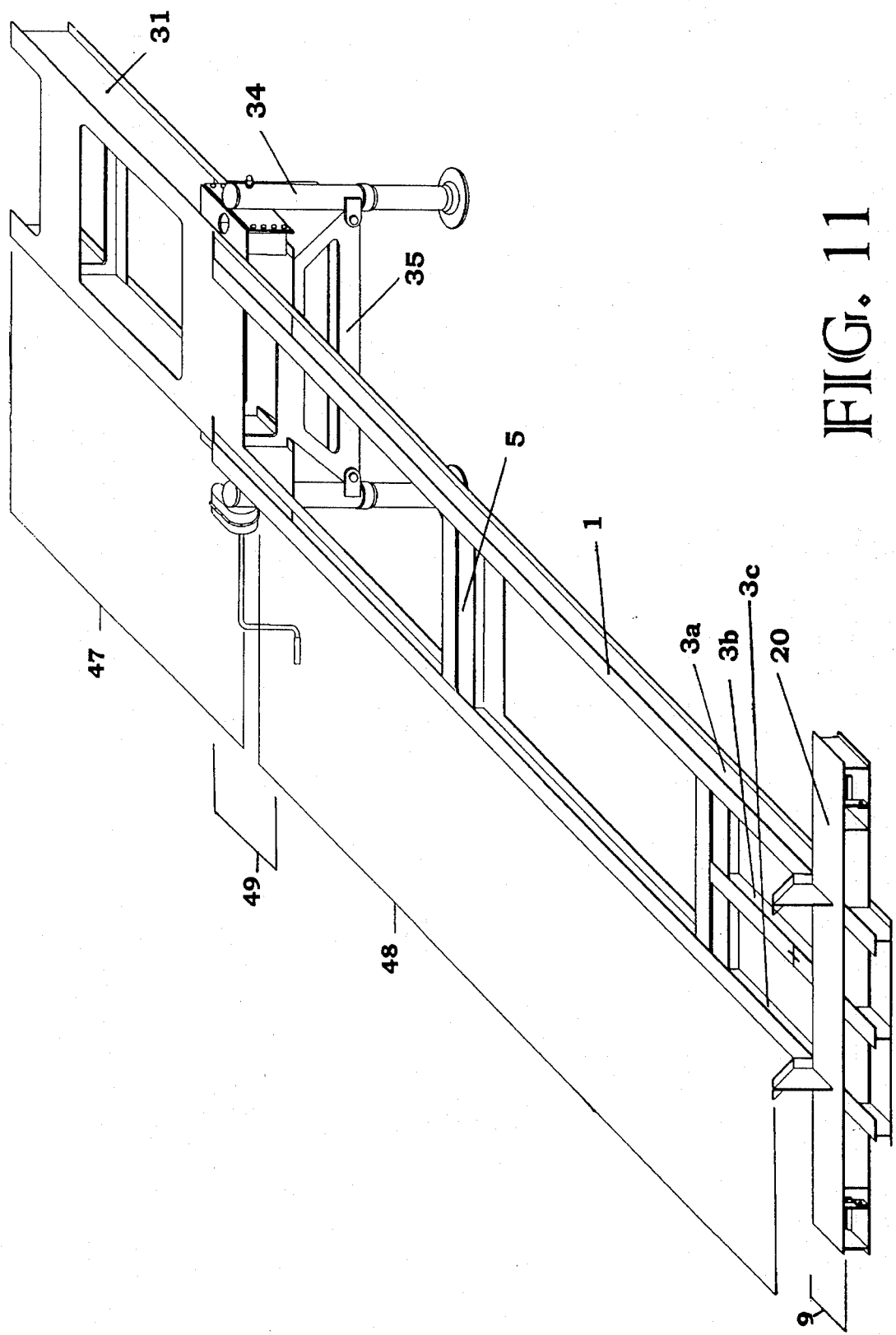
FIG. 11 depicts an isometric view of a neck member (31) nose section (47; 48.

FIG. 11 depicts an isometric view of a flat-neck member (31) of a bridging unibeam truck trailer chassis for hauling maximum weight loads. In this depiction the chassis is Viewed from above and to the right, prior to fastening the neck member (31) to the mid-section (32; i.e., not depicted in FIG. 11 as depicted in FIG. 9). Features depicted in FIG. 11 include the following: namely, the nose-section (47) and mid-section (48) of neck member (31); the landing gear mounting tubes (34); the lateral landing gear web (35); a lateral web (5); the continuous top uniflange (1); three longitudinal web members (3a, 3b, 3c); and the horizontal front bolster (20) that is of a fabricated "box-beam" unibeam construction (9; brackets). Also, for purposes of description only the landing gear mounting station (49) of neck member (31) is identified.

FIG. 12A,12B depicts an exploded view (top, FIG. 12A) and compressed view (bottom, FIG.12B) of the landing gear mounting station (49) of the neck member (31) of FIG. 11, supra, i.e., to the right of the figure is the nose-section (47) of FIG. 11 and to the left the mid-section (48) of FIG. 11. The chassis of FIG. 11 features a drop in elevation from the top surface of the mid-section (48) to nose-section 47. Extra chassis strength is gained at the landing gear mounting station (49) by using the elevation change to increase the depth of the longitudinal webs (3a,3b). Extra strength is also preferrably achieved by maintaining the continuity of the longitudinal web (3a,3b) through the transition, e.g., in the manner depicted in FIG. 12A,12B. FIG. 12A,12B depicts how the transition in elevation of the goose-neck is achieved. Central features include the following: namely, (i) the continuous uniflange (1) transitions from the top surface of the nose-section (47) to the bottom surface of the mid-section (48); (ii) longitudinal webs (3a, 3b) are cut to a shape that is 45-degrees to the horizontal axis at both the top and bottom, and the webs extend through slots (46) cut in the uniflange (1); (iii) longitudinal flanges (2a, 2b) of the nose-section (47) are cut at 45-degrees to the horizontal axis and terminate at the uniflange (1) of the mid-section (48); and, (iv) the longitudinal flange (2) of mid-section (48) is in an inverted orientation relative to depiction in FIG. 3 or FIG. 4A. Other features depicted include lateral landing gear web (35) and lateral landing gear flange (36).

Assembly of the chassis of FIGS. 11–12A,12B may be accomplished by (i) cutting slot (46) in the longitudinal flange (2a); (ii) cutting a longitudinal web (3a,3b) with a 45-degree "dog-leg", i.e., ⌐; (iii) setting the dog-leg of the longitudinal web (3a,3b) through slot (46), and then (iv) fastening together the uniflange (1) with the longitudinal flange (2) and the longitudinal web (3a,3b) with the respective longitudinal flanges (2a,2b,2c). The width of slot (46) is variable, and in certain embodiments it may prove convenient to cut the slot laterally to the outer edge of the uniflange so that the dog-leg portion of the longitudinal web is more easily inserted, i.e., from the outer edge of the uniflange into the slot. In other embodiments it may prove convenient to (a) cut the bottom portion off of the dog-leg (3a,3b), i.e, ⌐; (b) insert the cut-longitudinal web through slot 46; and, then (c) rejoin the bottom portion of the dog-leg with the top portion. In certain embodiments of the chassis of FIG. 11–12A,12B, it is desirable to change the web (3,5) depth in transitioning from the mid-section (32) of the chassis (i.e., from a material thickness of 3/16-inch) into the neck section (31; i.e., 5/16-inch). In the latter case the longitudinal web (3a,3b) of FIG. 12 may transition in thickness during the change in elevation that occurs at landing gear station (49). In addition, the longitudinal web (3a, 3b) depth may transition during the change in elevation at landing gear station (49), e.g., from a web depth of 6-inches in mid-section (48) to a web depth of 12 to 14-inches in the nose-section (47).

EXAMPLE 3

Extendable Tri-Flange Goose-Neck Unibeam Track Container Trailer Chassis

FIG. 13A,13B depicts an aligned top view (dashed vertical lines FIG. 13A) and side view (FIG. 13B) of a triflange 5-axle extendable goose-neck unibeam trailer chassis for hauling maximum weight containers (e.g., an allowable load up to about 74,000 lbs.) and fitted with a mid-section section slide to extend the chassis from 40-feet to 45-feet to 48-feet, according to EXAMPLE 2, below. In the depiction the chassis is extended to its 48-foot overall length. The positions of the different locking pin holes (40) in the unibeam chassis (42) are depicted as is the relative position of the extendable channel slide (39). The uniflange depth of the extendible rear portion of the chassis is 5/8-inch thick and the longitudinal web depth is about 2-feet deep. The chassis is fitted with a mid-section slide (39) to extend the chassis from 40-feet to 45-feet to 48 feet. The slide utilizes unibeams constructed so that a first "box-beam" unibeam slides onto a second "box-beam". The position of the inner box-beam relative to the outer box-beam being fixed with a pin inserted through a series of alignment holes.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A flexible lightweight unibeam maximum weight container chassis capable of carrying loads of about 40,000 pounds to about 99,000 pounds, said maximum weight container chassis having a gross weight of about 3,500 pounds to about 13,000 pounds, and said maximum weight combiner chassis comprising:

at least two longitudinal unbeam member and at least two lateral unibeam members each of which members being joined the one to the other by a single contiguous uniflange, wherein
said at least two longitudinal unibeam members each comprise a longitudinal web, a longitudinal flange, and the uniflange, said at least two lateral unibeam members each comprise a lateral web, a lateral flange, and the uniflange, and
the single contiguous uniflange being fastened in a perpendicular orientation to each of the longitudinal and lateral webs, and the longitudinal and lateral flanges being fastened in a perpendicular orientation to each of the longitudinal and lateral webs respectively; and said maximum weight container chassis further comprising a neck member, a mid-section member, and a rear member wherein each member comprises said uniflange, said longitudinal webs and said lateral webs said maximum weight container chassis rear member further comprising a lateral axle web fastened to the uniflange, one of the longitudinal webs, and to each of two supporting lateral axle flanges, wherein each of the two supporting lateral axle flanges is fastened in turn to the longitudinal flanges and the longitudinal webs; and, a plurality of axle spring hangers for mounting axle springs to hold a plurality of axles;

said maximum weight container chassis further comprising an overall length of about 20 to about 48 feet and 2 to 5 axles; and, wherein the lateral flange and the longitudinal flange of said maximum weight container chassis each comprise a width of about 4 inches and the longitudinal webs comprise a depth of about 12 inches to about 20 inches; and, wherein the longitudinal and lateral webs comprise about 3/16-inch thick to about 1/2-inch thick sleek said steel being selected from among 50K steel, 70K steel, 50K Corten steel, and 90K/TI steel.

2. The chassis according to claim 1 having an overall length of about 40 to about 48 feet, 3 to 5 axles, and a gross weight of about 8,500 pounds to about 13,000 pounds.

3. The chassis of claim 2, wherein the steel comprising the longitudinal and the lateral webs in the neck member is about 5/16-inch steel and the steel comprising the longitudinal and lateral webs in the mid-section member and the rear member is about 3/16-inch steel.

4. The chassis of claim 3, wherein the steel comprising the uniflange in both the neck member and the rear member is about 5/16-inch steel and the steel comprising the uniflange in the mid-section member is about 1/4-inch steel.

5. The chassis according to claim 4 having an overall length of about 48 feet, 4 axles and a gross weight of about 10,750 pounds to about 11,500 pounds.

6. The chassis according to claim 4 having an overall length of about 40 to about 48 feet, 3 axles and a gross weight of about 8,500 pounds to about 10,000 pounds.

7. The chassis according to claim 4 having an overall length of about 40 to about 48 feet, 4 axles and a gross weight of about 10,000 pounds to about 11,500 pounds.

8. The chassis according to claim 4 having an overall length of about 40 to about 48 feet, 5 axles and a gross weight of about 11,500 pounds to about 13,000 pounds.

* * * * *